(12) United States Patent
Yamada et al.

(10) Patent No.: US 10,521,374 B2
(45) Date of Patent: Dec. 31, 2019

(54) SEMICONDUCTOR INTEGRATED CIRCUIT DEVICE AND METHOD FOR COMPARING DATA

(71) Applicant: Renesas Electronics Corporation, Tokyo (JP)

(72) Inventors: Hiromichi Yamada, Tokyo (JP); Akihiro Yamate, Tokyo (JP); Yoichi Yuyama, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/054,784

(22) Filed: Aug. 3, 2018

(65) Prior Publication Data

US 2019/0087367 A1 Mar. 21, 2019

(30) Foreign Application Priority Data

Sep. 15, 2017 (JP) .................................. 2017-178074

(51) Int. Cl.
*G06F 13/24* (2006.01)
*G06F 13/28* (2006.01)
(Continued)

(52) U.S. Cl.
CPC .......... *G06F 13/24* (2013.01); *G06F 11/3089* (2013.01); *G06F 11/348* (2013.01);
(Continued)

(58) Field of Classification Search
CPC combination set(s) only.
See application file for complete search history.

(56) References Cited

U.S. PATENT DOCUMENTS 5,485,582 A * 1/1996 Okabayashi ............ G06F 13/28
710/3
5,842,078 A * 11/1998 Togashi .................. G06F 13/24
710/48

(Continued)

FOREIGN PATENT DOCUMENTS

JP   H09-146709 A    6/1997
JP   5094591 B2     12/2012

OTHER PUBLICATIONS

European Search Report dated Feb. 13, 2019 for European Patent Application No. 18186793.8-1224.

*Primary Examiner* — Raymond N Phan
(74) *Attorney, Agent, or Firm* — McGinn IP Law Group, PLLC

(57) ABSTRACT

Data on a memory space are compared without using a CPU, and an interrupt is generated in an interrupt condition based on at least one of the number of times of the comparison and the number of times of coincidence with a comparison condition. An interrupt controller outputs an interrupt signal to a first CPU core or a second CPU core. A DMAC transfers data on the memory space to at least one of a first buffer and a second buffer. A comparison circuit compares the data of the first buffer with the data of the second buffer. A condition coincidence frequency counter counts the number of times at which the comparison in the comparison circuit coincides with a comparison condition. An interrupt request circuit outputs an interrupt request to the interrupt controller, based on at least one of a value of the condition coincidence frequency counter and a value of a comparison frequency counter.

20 Claims, 19 Drawing Sheets

(51) Int. Cl.
*G06F 13/16* (2006.01)
*G06F 13/32* (2006.01)
*G06F 11/34* (2006.01)
*G06F 11/30* (2006.01)

(52) U.S. Cl.
CPC .......... *G06F 13/1673* (2013.01); *G06F 13/28* (2013.01); *G06F 13/32* (2013.01); *G06F 2201/86* (2013.01); *G06F 2201/88* (2013.01)

(56) References Cited

U.S. PATENT DOCUMENTS

| | | | | |
|---|---|---|---|---|
| 5,978,865 | A * | 11/1999 | Hansen | G06F 13/32 710/22 |
| 6,287,470 | B1 * | 9/2001 | Vetter | B29B 15/04 210/718 |
| 6,760,799 | B1 * | 7/2004 | Dunlap | G06F 13/385 710/18 |
| 2014/0013021 | A1 * | 1/2014 | Matsumoto | G06F 13/24 710/267 |
| 2014/0032860 | A1 | 1/2014 | Yamada et al. | |

* cited by examiner

FIG. 3A

TRANSFER CONTROL REGISTER

FIG. 3B

| FIELD | NAME | FUNCTION | VALUE AND MEANING |
|---|---|---|---|
| ST | STart | SETTING OF START/ STOP OF TRANSFER | 0: STOP<br>1: START |
| MA | Mode A | SETTING OF TRANSFER MODE OF CHANNEL A | 0: NO TRANSFER<br>1: ONE TRANSFER<br>2: TRANSFER OF FREQUENCY BY C |
| MB | Mode B | SETTING OF TRANSFER MODE OF CHANNEL B | 0: NO TRANSFER<br>1: ONE TRANSFER<br>2: TRANSFER OF FREQUENCY BY C |
| C | Count | SETTING OF TRANSFER FREQUNECY | VALUE IS TRANSFER FREQUENCY |

FIELD OF TRANSFER CONTROL REGISTER

CHANNEL A IS TRANSFERRED EIGHT TIMES (MA=2, MB=0, C=8)

CHANNEL A IS TRANSFERRED FOUR TIMES AND
CHANNEL B IS TRANSFERRED ONCE (MA=2, MB=1, C=4)

CHANNEL A IS TRANSFERRED FOUR TIMES AND
CHANNEL B IS TRANSFERRED FOUR TIMES (MA=2, MB=2, C=4)

FIG. 5A

| ST | C | M | DS | DF | AE |
|----|---|---|----|----|----|

COMPARISON CONTROL REGISTER

FIG. 5B

| FIELD | NAME | FUNCTION | VALUE AND MEANING |
|-------|------|----------|-------------------|
| ST | STart | SETTING OF START/ STOP OF COMPARISON | 0: STOP<br>1: START |
| C | Condition | SETTING OF COMPARISON CONDITION | 0: A = B<br>1: A ≠ B<br>2: A ≧ B<br>3: A > B<br>4: A ≦ B<br>5: A < B |
| M | Method | SETTING OF COMPARISON METHOD | 0: SIMPLE COMPARISON<br>1: ERROR ALLOWANCE COMPARISON |
| DS | Data Size | SETTING OF DATA SIZE | 0: 8 BITS<br>1: 16 BITS<br>2: 32 BITS<br>3: 64 BITS |
| DF | Data Form | SETTING OF DATA FORMAT | 0: NO SIGN<br>1: COMPLEMENT OF 2<br>2: FLOATING-POINT NUMBER |
| AE | Allowable Error | SETTING OF ALLOWABLE ERROR | VALUE IS ALLOWABLE ERROR |

FIELD OF COMPARISON CONTROL REGISTER

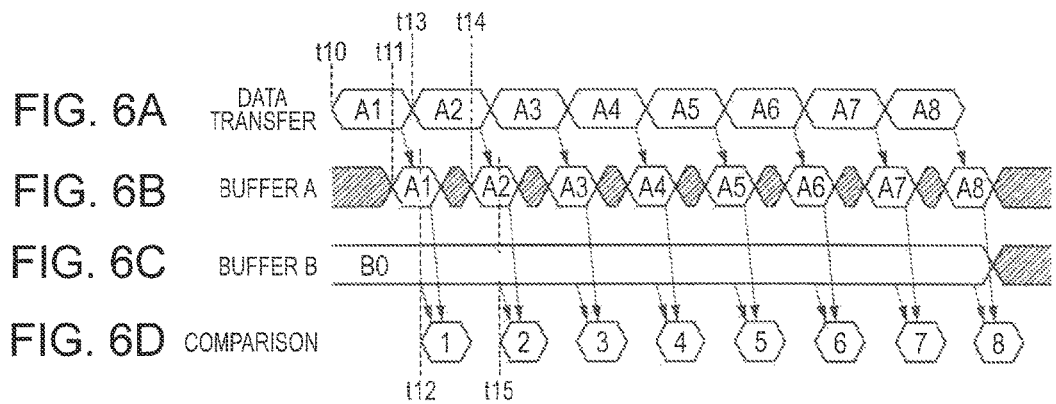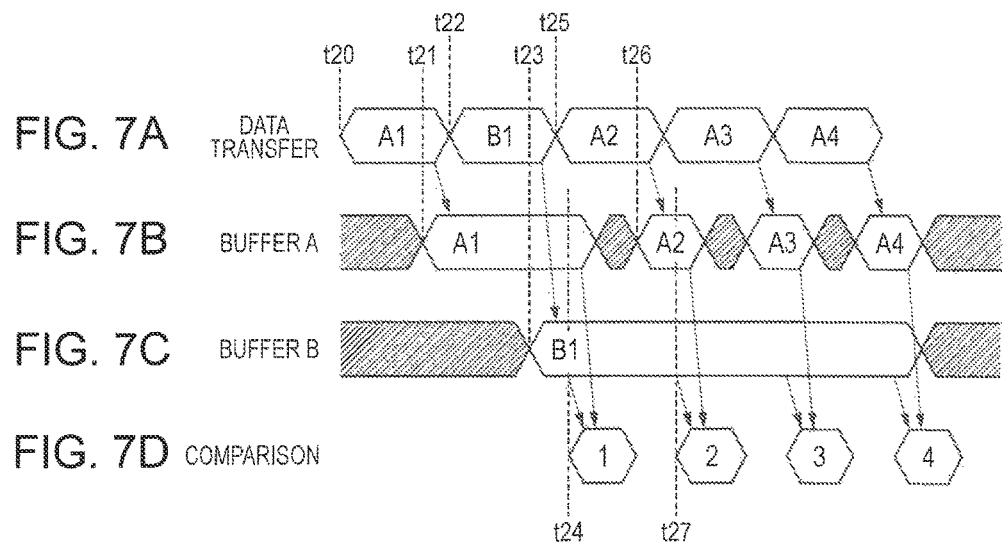

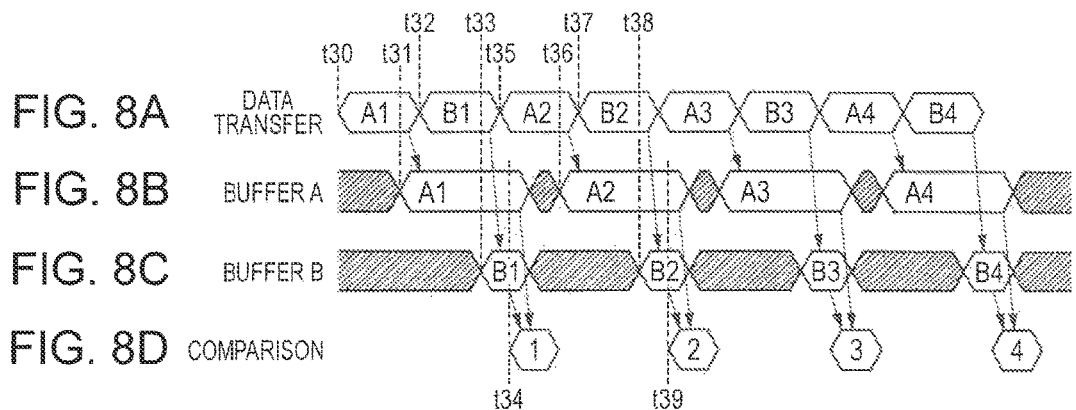
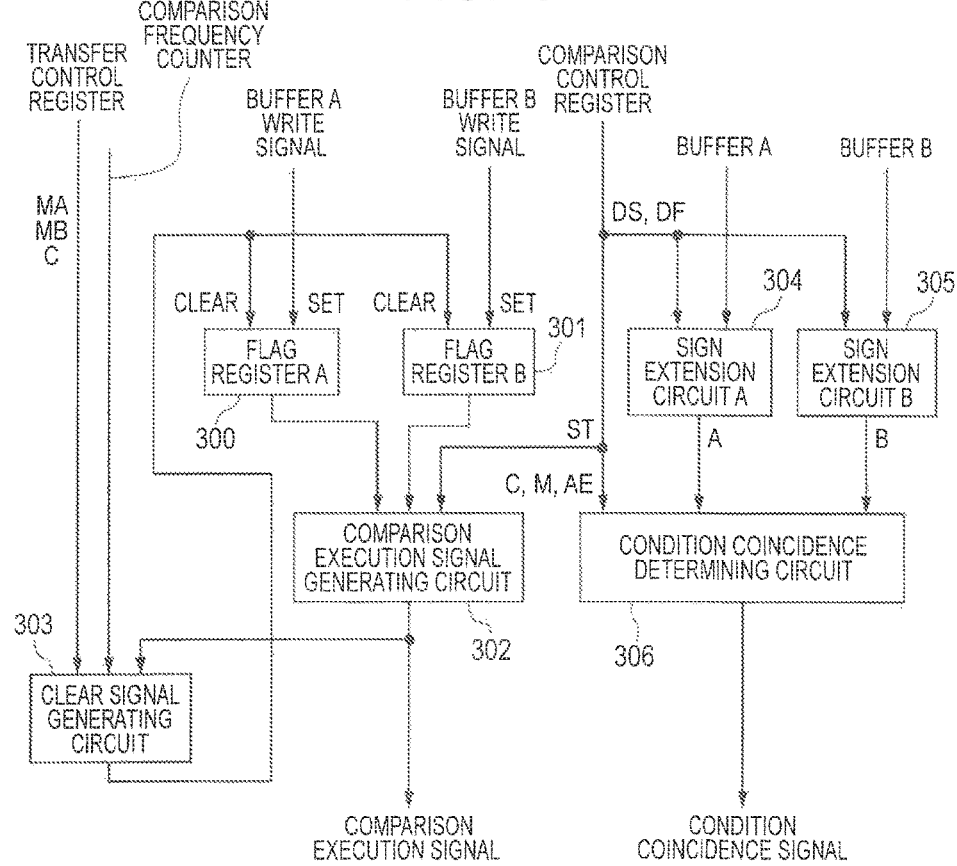

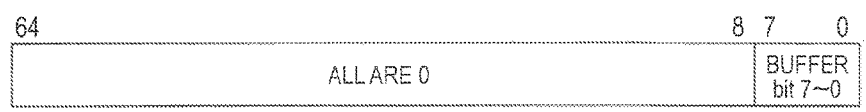
8 BITS, NO SIGN (DS=0, DF=0)
16 BITS, NO SIGN (DS=1, DF=0)
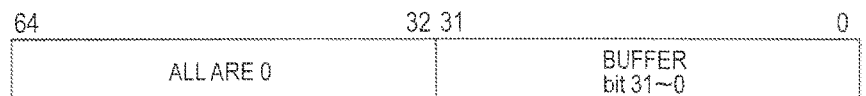
32 BITS, NO SIGN (DS=2, DF=0)
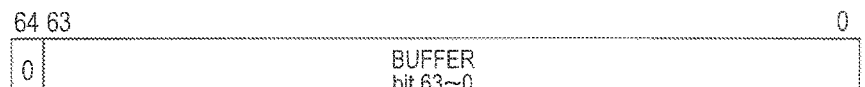
64 BITS, NO SIGN (DS=3, DF=0)

FIG. 11A

```
64                                        8 7     0
┌─────────────────────────────────┬──────────┐
│     ALL ARE BUFFER bit 7        │ BUFFER   │
│                                 │ bit 7~0  │
└─────────────────────────────────┴──────────┘
```
8 BITS, COMPLEMENT OF 2 (DS=0, DF=1)

FIG. 11B

```
64                              16 15       0
┌──────────────────────────┬──────────────┐
│   ALL ARE BUFFER bit 15  │   BUFFER     │
│                          │   bit 15~0   │
└──────────────────────────┴──────────────┘
```
16 BITS, COMPLEMENT OF 2 (DS=1, DF=1)

FIG. 11C

```
64                  32 31                   0
┌──────────────────┬─────────────────────┐
│ ALL ARE BUFFER bit 31 │    BUFFER      │
│                   │    bit 31~0        │
└──────────────────┴─────────────────────┘
```
32 BITS, COMPLEMENT OF 2 (DS=2, DF=1)

FIG. 11D

```
64 63                                       0
┌─┬────────────────────────────────────────┐
│ │            BUFFER                      │
│ │            bit 63~0                    │
└─┴────────────────────────────────────────┘
```
BUFFER bit 63     64 BITS, COMPLEMENT OF 2 (DS=3, DF=1)

FIG. 12A

```
64                                        7 6      0
┌──────────────────────────────────┬──────────┐
│          ALL ARE 0               │ BUFFER   │
│                                  │ bit 6~0  │
└──────────────────────────────────┴──────────┘
```

WHEN BUFFER bit 7 IS 1, ABOVE DATA IS INVERTED AND 1 IS ADDED TO bit 0

8 BITS, FLOATING-POINT NUMBER (DS=0, DF=2)

FIG. 12B

```
64                              15 14            0
┌──────────────────────────┬──────────────────┐
│       ALL ARE 0          │     BUFFER       │
│                          │    bit 14~0      │
└──────────────────────────┴──────────────────┘
```

WHEN BUFFER bit 15 IS 1, ABOVE DATA IS INVERTED AND 1 IS ADDED TO bit 0

16 BITS, FLOATING-POINT NUMBER (DS=1, DF=2)

FIG. 12C

```
64                  31 30                        0
┌──────────────┬──────────────────────────────┐
│  ALL ARE 0   │          BUFFER              │
│              │         bit 30~0             │
└──────────────┴──────────────────────────────┘
```

WHEN BUFFER bit 31 IS 1, ABOVE DATA IS INVERTED AND 1 IS ADDED TO bit 0

32 BITS, FLOATING-POINT NUMBER (DS=2, DF=2)

FIG. 12D

```
64 63 62                                         0
┌──┬──┬────────────────────────────────────────┐
│0 │0 │             BUFFER                     │
│  │  │            bit 62~0                    │
└──┴──┴────────────────────────────────────────┘
```

WHEN BUFFER bit 63 IS 1, ABOVE DATA IS INVERTED AND 1 IS ADDED TO bit 0

64 BITS, FLOATING-POINT NUMBER (DS=3, DF=2)

FIG. 13

| No. | COMPARISON METHOD | COMPARISON CONDITION | M | C | A, B, AE | CONDITION COINCIDENC SIGNAL |
|---|---|---|---|---|---|---|
| 0 | SIMPLE COMPARISON | A = B | 0 | 0 | A = B | 1 |
| 1 | | A ≠ B | 0 | 1 | A ≠ B | 1 |
| 2 | | A ≧ B | 0 | 2 | A ≧ B | 1 |
| 3 | | A > B | 0 | 3 | A > B | 1 |
| 4 | | A ≦ B | 0 | 4 | A ≦ B | 1 |
| 5 | | A < B | 0 | 5 | A < B | 1 |
| 6 | ERROR ALLOWANCE COMPARISON | A = B | 1 | 0 | $|A-B| \leq AE$ | 1 |
| 7 | | A ≠ B | 1 | 1 | $|A-B| > AE$ | 1 |
| 8 | | A ≧ B | 1 | 2 | A ≧ B − AE | 1 |
| 9 | | A > B | 1 | 3 | A > B − AE | 1 |
| 10 | | A ≦ B | 1 | 4 | A ≦ B + AE | 1 |
| 11 | | A < B | 1 | 5 | A < B + AE | 1 |
| 12 | OTHER THAN ABOVE | | | | | 0 |

FIG. 14

COMPARISON CONDITION: A=B
COMPARISON METHOD: SIMPLE COMPARISON  DATA SIZE: 8 BITS
DATA FORMAT: COMPLEMENT OF 2

| FREQUENCY | 1 | 2 | 3 | 4 | 5 | 6 |
|---|---|---|---|---|---|---|
| BUFFER A | 79 | 32 | −128 | 65 | −45 | 5 |
| BUFFER B | 84 | 33 | −128 | 62 | −40 | 5 |
| CONDITION COINCIDENCE FREQUENCY COUNTER | 0 | 0 | 1 | 1 | 1 | 2 |

FIG. 15

COMPARISON CONDITION: A=B
COMPARISON METHOD: ERROR ALLOWANCE COMPARISON    DATA SIZE: 8 BITS
DATA FORMAT: COMPLEMENT OF 2    ALLOWABLE ERROR: 3

| FREQUENCY | 1 | 2 | 3 | 4 | 5 | 6 |
|---|---|---|---|---|---|---|
| BUFFER A | 79 | 32 | -128 | 65 | -45 | 5 |
| BUFFER B | 84 | 33 | -128 | 62 | -40 | 5 |
| CONDITION COINCIDENCE FREQUENCY COUNTER | 0 | 1 | 2 | 3 | 3 | 4 |

FIG. 16A

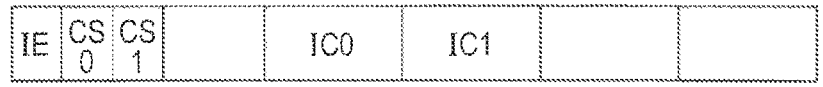

INTERRUPT CONTROL REGISTER

FIG. 16B

| FIELD | NAME | FUNCTION | VALUE AND MEANING |
|---|---|---|---|
| IE | Interrupt Enable | SETTING OF INTERRUPT REQUEST | 0: NO REQUEST<br>1: REQUEST |
| CS0 | Counter Select 0 | SETTING OF USE OF COMPARISON FREQUENCY COUNTER FOR INTERRUPT CONDITION | 0: NO USE<br>1: USE |
| CS1 | Counter Select 1 | SETTING OF USE OF CONDITION COINCIDENCE FREQUENCY COUNTER FOR INTERRUPT CONDITION | 0: NO USE<br>1: USE |
| IC0 | Interrupt Count 0 | SETTING OF COMPARISON FREQUENCY OF INTERRUPT CONDITION | VALUE IS FREQUENCY |
| IC1 | Interrupt Count 1 | SETTING OF CONDITION COINCIDENCE FREQUENCY OF INTERRUPT CONDITION | VALUE IS FREQUENCY |

FIELD OF INTERRUPT CONTROL REGISTER

COMPARISON CONDITION: A ≠ B
COMPARISON METHOD: SIMPLE COMPARISON
DATA SIZE: 8 BITS    DATA FORMAT: COMPLEMENT OF 2
COUNTER USED FOR INTERRUPT CONDITION: CONDITION
          COINCIDENCE FREQUENCY COUNTER
FREQUENCY OF INTERRUPT CONDITION: 1

| FREQUENCY | 1 | 2 | 3 | 4 | 5 | 6 |
|---|---|---|---|---|---|---|
| BUFFER A | 79 | 32 | −128 | 65 | | |
| BUFFER B | 79 | 32 | −128 | 62 | | |
| CONDITION COINCIDENCE FREQUENCY COUNTER | 0 | 0 | 0 | 1 | | |

INTERRUPT REQUEST
GENERATION

FIG. 20A

INTERRUPT CONTROL REGISTER

FIG. 20B

| FIELD | NAME | FUNCTION | VALUE AND MEANING |
|---|---|---|---|
| IE | Interrupt Enable | SETTING OF INTERRUPT REQUEST | 0: NO REQUEST<br>1: REQUEST |
| CS0 | Counter Select 0 | SETTING OF USE OF COMPARISON FREQUENCY COUNTER FOR INTERRUPT CONDITION | 0: NO USE<br>1: USE |
| CS1 | Counter Select 1 | SETTING OF USE OF CONDITION COINCIDENCE FREQUENCY COUNTER 1 FOR INTERRUPT CONDITION | 0: NO USE<br>1: USE |
| CS2 | Counter Select 2 | SETTING OF USE OF CONDITION COINCIDENCE FREQUENCY COUNTER 2 FOR INTERRUPT CONDITION | 0: NO USE<br>1: USE |
| CS3 | Counter Select 3 | SETTING OF USE OF CONDITION COINCIDENCE FREQUENCY COUNTER 3 FOR INTERRUPT CONDITION | 0: NO USE<br>1: USE |
| IC0 | Interrupt Count 0 | SETTING OF COMPARISON FREQUENCY OF INTERRUPT CONDITION | VALUE IS FREQUENCY |
| IC1 | Interrupt Count 1 | SETTING OF CONDITION COINCIDENCE FREQUENCY 1 OF INTERRUPT CONDITION | VALUE IS FREQUENCY |
| IC2 | Interrupt Count 2 | SETTING OF CONDITION COINCIDENCE FREQUENCY 2 OF INTERRUPT CONDITION | VALUE IS FREQUENCY |
| IC3 | Interrupt Count 3 | SETTING OF CONDITION COINCIDENCE FREQUENCY 3 OF INTERRUPT CONDITION | VALUE IS FREQUENCY |

FIELD OF INTERRUPT CONTROL REGISTER

FIG. 21

SETTING OF COMPARISON CONTROL REGISTER 1
COMPARISON CONDITION: A=B
COMPARISON METHOD: SIMPLE COMPARISON    DATA SIZE: 8 BITS
DATA FORMAT: COMPLEMENT OF 2

SETTING OF COMPARISON CONTROL REGISTER 2
COMPARISON CONDITION: A=B
COMPARISON METHOD: ERROR ALLOWANCE COMPARISON    DATA SIZE: 8 BITS
DATA FORMAT: COMPLEMENT OF 2    ALLOWABLE ERROR: 3

| FREQUENCY | 1 | 2 | 3 | 4 | 5 | 6 |
|---|---|---|---|---|---|---|
| BUFFER A | 79 | 32 | −128 | 65 | −45 | 5 |
| BUFFER B | 84 | 33 | −128 | 62 | −40 | 5 |
| CONDITION COINCIDENCE FREQUENCY COUNTER 1 | 0 | 0 | 1 | 1 | 1 | 2 |
| CONDITION COINCIDENCE FREQUENCY COUNTER 2 | 0 | 1 | 2 | 3 | 3 | 4 |

SEMICONDUCTOR INTEGRATED CIRCUIT DEVICE AND METHOD FOR COMPARING DATA

CROSS-REFERENCE TO RELATED APPLICATIONS

The disclosure of Japanese Patent Application No. 2017-178074 filed on Sep. 15, 2017 including the specification, drawings and abstract is incorporated herein by reference in its entirety.

BACKGROUND

The present invention relates to a semiconductor integrated circuit device and a data comparing method, and to, for example, a semiconductor integrated circuit device having a function of comparing a plurality of data and a data comparing method in such a semiconductor integrated circuit device.

Patent Document 1 discloses a control device having a high reliability AD (Analog to Digital) converting function. The control device described in Patent Document 1 has a plurality of pairs of AD and operation modules. In Patent Document 1, a check is made about how far the difference between data converted by the respective AD modules is apart from a standard value for the difference (difference check). Each operation module has a CPU (Central Processing Unit). In each operation module, a comparison between the data in the difference check or the like is executed by the CPU.

Patent Document 2 discloses a collation system. The collation system described in Patent Document 2 has a plurality of multiplexed CPUs and a data collator. Each CPU performs the same processing and outputs data to a memory. The data collator compares (collates) output data of the respective CPUs, which are stored in the memory, and outputs its collation result. In Patent Document 2, the data collator is configured of a hardware circuit including exclusive-OR gates.

RELATED ART DOCUMENTS

Patent Documents

[Patent Document 1] Japanese Unexamined Patent Publication Laid-Open No. Hei 9 (1997)-146709
[Patent Document 2] Japanese Patent No. 5094591

SUMMARY

In general, a CPU has a comparison instruction of performing a comparison in conditions such as "coincident", "non-coincident", "large or equal", "large", "small or equal" and "small", etc. in terms of two operands. The executed result of comparison instruction is reflected to a flag (e.g., T bit) lying in a register holding the status of the CPU, which is called PSW (Program Status Word). The instruction of the CPU includes an instruction which refers to the T bit. Specifically, the instruction of the CPU includes a condition branching instruction such as a branch being taken if the T bit is "1", or a branch being taken if the T bit is "0".

In Patent Document 1, a comparison allowing an error is executed using the CPU. Here, the comparison allowing the error is performed by a comparison instruction with a difference between data to be compared and an allowable error as operands In Patent Document 1, the CPU has been used in execution of the comparison. Thus, arbitrary comparisons such as a simple comparison, a comparison allowing an error, etc. can be carried out by a program executed on the CPU. In Patent Document 1, however, a problem arises in that since the comparison is performed using the comparison instruction of the CPU, the time required until the comparison result is obtained is relatively long.

In contrast to the above, in Patent Document 2, the output data of the respective CPUs, which are stored in the memory are read and collated by dedicated hardware. In this case, the speed enhancement of processing can be expected as compared with the case where the comparison is performed using the CPU. Further, it is possible to reduce a processing load of the CPU. In Patent Document 2, however, a method for the comparison is limited to the comparison that "the output data of the multiplexed CPUs coincide".

Other objects and novel features of the present invention will become apparent from the description of the present specification and the accompanying drawings.

According to one aspect of the present invention, there is provided a semiconductor integrated circuit device including a transfer circuit which transfers data on a memory space to a first buffer and a second buffer, a comparison circuit which compares first data stored in the first buffer with second data stored in the second buffer, a comparison frequency counter which counts the number of times of comparison, a comparison condition coincidence frequency counter which counts the number of times of coincidence with a comparison condition, and an interrupt request circuit which outputs an interrupt request, based on at least one of the number of times of the comparison and the number of times of the coincidence.

According to the one aspect, it is possible to compare data on a memory space without using a CPU and generate an interrupt in an interrupt condition based on at least one of the number of times of comparison and the number of times of coincidence with a comparison condition.

BRIEF DESCRIPTION OF THE DRAWINGS

FIGS. 3A and 3D are respectively diagrams showing one example of the specification of a transfer control register;

FIGS. 5A and 5B are respectively diagrams showing one example of the specification of a comparison control register;

FIGS. 6A-6D are timing charts showing an operation example of a data comparison;

FIGS. 7A-7D are timing charts showing an operation example of a data comparison;

FIGS. 8A-8D are timing charts showing an operation example of a data comparison;

FIG. 9 is a block diagram showing a configuration example of a comparison circuit;

FIGS. 10A through 10D are respectively diagrams showing an example of sign extension to sign-free data;

FIGS. 11A through 11D are respectively diagrams showing an example of sign extension to complement data of 2;

FIGS. 12A through 12D are respectively diagrams showing an example of sign extension to floating-point number data;

FIG. 13 is a function table showing a condition coincidence determining function of a condition coincidence determining circuit;

FIG. 14 is a diagram illustrating the values of respective parts where a simple comparison is performed;

FIG. 15 is a diagram illustrating the values of the respective parts where an error allowance comparison is performed;

FIGS. 16A and 16B are respectively diagrams showing one example of the specification of an interrupt control register;

FIGS. 20A and 20B are respectively diagrams showing one example of the specification of an interrupt control register used in the embodiment 2;

FIG. 21 is a diagram showing the values of respective parts where a simple comparison and an error allowance comparison are performed;

DETAILED DESCRIPTION

Figure 1:
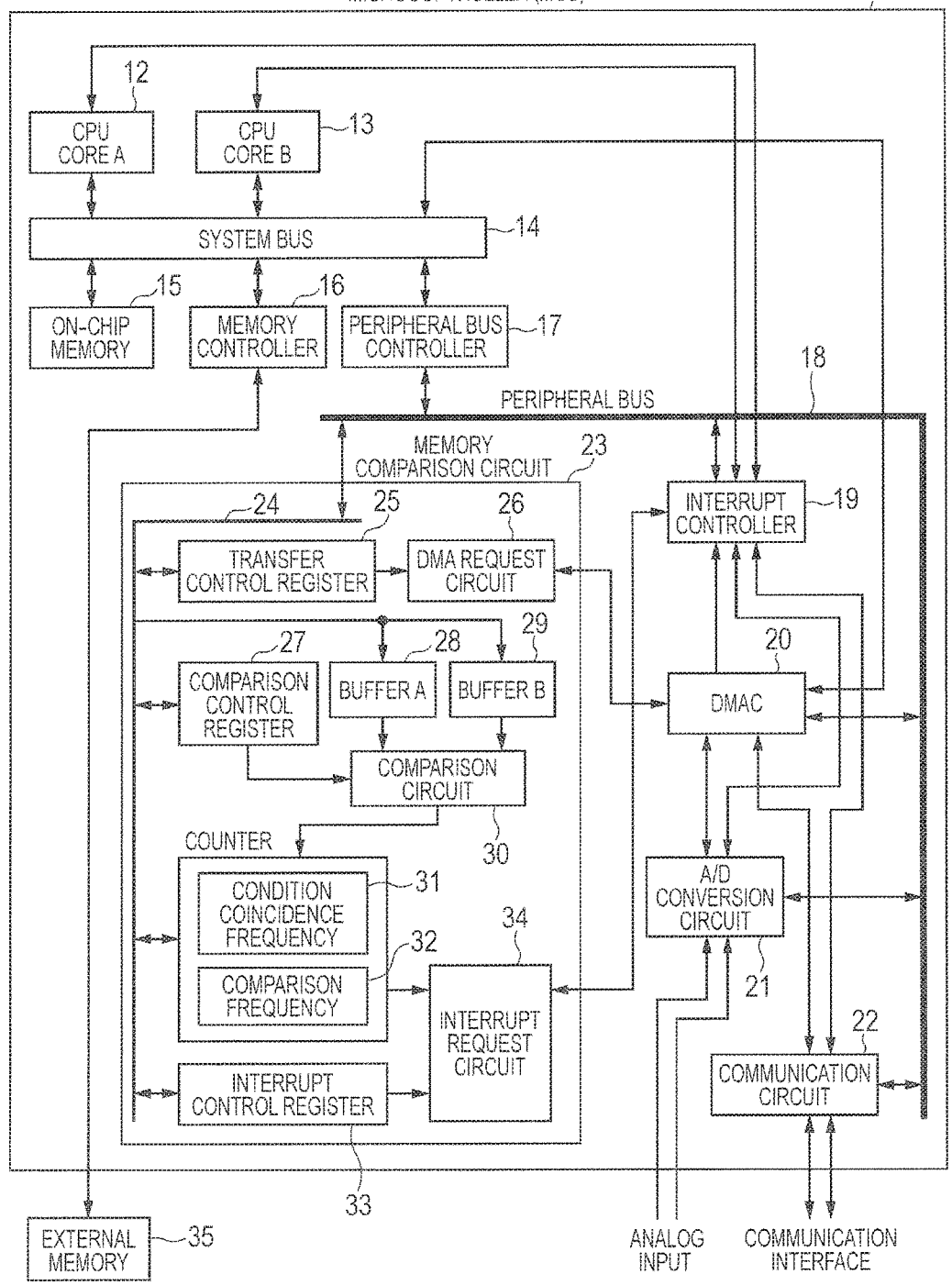
FIG. 1 is a block diagram showing a microcontroller unit having a memory comparison circuit according to an embodiment 1.

Preferred embodiments with means for solving the problems applied thereto will hereinafter be described in detail with reference to the accompanying drawings. For clarity of explanation, the following description and drawings have been appropriately omitted and simplified. Further, the respective elements described in the drawings as functional blocks which perform various processing can be configured by CPUs, memories or other circuits in terms of hardware, and are realized by programs loaded in memories or the like in terms of software. Accordingly, it will be understood by those skilled in the art that these functional blocks can be realized in various forms by only hardware, only software or their combination. They are not limited to any of them. Incidentally, in the respective drawings, the same elements are respectively denoted by the same reference numerals, and their dual description will be omitted as needed.

Further, the above-described programs are stored using various types of non-transitory computer readable mediums and can be supplied to a computer. The non-transitory computer readable mediums include various types of substantial recording mediums. Examples of the non-transitory computer readable mediums include a magnetic recording medium (e.g., flexible disk, magnetic tape, hard disk), an optical magnetic recording medium (e.g., optical magnetic disk), a CD-ROM (Read Only Memory), a CD-R, a CD-R/W, and a semiconductor memory (e.g., mask ROM, PROM (Programmable ROM), EPROM (Erasable PROM), flash ROM, RAM (Random Access Memory)). Further, the programs may be supplied to the computer by various types of transitory computer readable mediums. Examples of the transitory computer readable mediums include an electric signal, and optical signal, and an electromagnetic wave. The transitory computer readable mediums are capable of supplying programs to the computer through a wired communication path such as an electric wire and an optical fiber or the like, or a wireless communication path.

The invention will be described by being divided into a plurality of sections or embodiments whenever circumstances require it for convenience in the following embodiments. However, unless otherwise specified in particular, they are not irrelevant to one another. One thereof has to do with modifications, applications, detailed descriptions or supplementary explanations, etc. of some or all of the other. Also, when reference is made to the number of elements or the like the number of pieces, numerical values, quantity, range, etc.) in the following embodiments, the number thereof is not limited to a specific number and may be greater than or less than or equal to the specific number except for where otherwise specified in particular and definitely limited to the specific number in principle, etc.

Further, in the following embodiments, components (also including operation steps, etc.) employed therein are not always essential except for where otherwise specified in particular and considered to be definitely essential in principle, etc. Similarly, when reference is made to the shapes or positional relations and the like of the components or the like in the following embodiments, they will include ones substantially analogous or similar to their shapes or the like except for where otherwise specified in particular and considered not to be definitely so in principle, etc. This is similarly applied even to the above-described numbers and the like (including the number of pieces, numerical values, quantity, range, etc.).

[Embodiment 1]

FIG. 1 shows a semiconductor integrated circuit device according to an embodiment 1. In the present embodiment, the semiconductor integrated circuit device is configured as a microcontroller unit (MCU). The MCU 10 includes a CPU core A 12, a CPU core B 13, a system bus 14, an on-chip memory 15, a memory controller 16, a peripheral bus controller 17, a peripheral bus 18, an interrupt controller 19, a DMAC (Direct Memory Access Controller) 20, an AD conversion circuit 21, a communication circuit 22, and a memory comparison circuit 23.

In the MCU 10, the CPU core A 12, the CPU core B 13, the on-chip memory 15, the memory controller 16, and the peripheral bus controller 17 are mutually coupled through the system bus 14. Further, the peripheral bus controller 17, the interrupt controller 19, the DMAC 20, the A/D conversion circuit 21, the communication circuit 22, and the memory comparison circuit 23 are mutually coupled through the peripheral bus 18. The CPU core A 12 and the CPU core B 13 are accessible to the peripheral bus 18 through the peripheral bus controller 17. Further, the CPU core A 12 and the CPU core B 13 are accessible via the memory controller 16 to an external memory 35 coupled to the outside.

The system bus 14 performs access to the on-chip memory 15, the external memory 35, and the peripheral bus controller 17 with each of the CPU core A 12, the CPU core B 13 and the DMAC 20 as a bus master. When the access from the corresponding bus master coupled to the system bus 14 is access to a circuit coupled to the peripheral bus 18, the peripheral bus controller 17 outputs an access signal to the peripheral bus 18 to read data from the target circuit or write data into the target circuit. The data read from the peripheral bus 18 is output to the bus master of the system bus 14.

The CPU core A 12 and the CPU core B 13 read a program from the on-chip memory 15 or the external memory 35 and executes the sane. Each of the CPU core A 12 and the CPU core B 13 updates, for example, its own register, the on-chip memory 15 and the external memory 35 with the execution of the program. Each of the CPU core A 12 and the CPU core B 13 are respectively equipped with a cache memory and hold parts of programs and data in cacheable address spaces of the on-chip memory 15 and the external memory 35. Incidentally, the number of the CPU cores included in the MCU 10 is not limited to two. In the MCU 10, the number of CPU cores may be one or three or more.

When an interrupt request is generated, the interrupt controller 19 outputs an interrupt signal to the CPU core A 12 or the CPU core B 13. When the CPU core A 12 or the CPU core B 13 receives the interrupt signal therein, the CPU core A 12 or the CPU core B 13 interrupts the program that was running, and starts interrupt processing. In the present embodiment, in the MCU 10, the DMAC 20, the A/D conversion circuit 21, the communication circuit 22, and the memory comparison circuit 23 are assumed to generate an interrupt request.

The DMAC 20 performs the transfer of data between memories mapped in a memory space or between a memory and a circuit. The DMAC 20 has various registers mapped onto the memory space. The CPU core A 12 and the CPU core B 13 set information related to DMA transfer, such as a data transfer source address, a data transfer destination address, an address updating method (increment/decrement/fixing), a transfer frequency, and a data size, etc. to the various registers. The DMAC 20 has a plurality of channels and is configured to be able to set the information related to the DMA transfer for every channel. A transfer mode for the DMA transfer includes a mode of executing transfer by the number of times of transfer set by setting the start register of the DMAC 20 to '1', and a mode of transferring data for one time each according to a DMA request signal output from the corresponding circuit. The DMAC 20 has an interrupt request function and is capable of requesting an interrupt to the interrupt controller 19 when the transfer is finished.

The A/D conversion circuit 21 converts an analog signal input from the outside of the MCU 10 into a digital signal. The digital signal is stored in a register or memory in the A/D conversion circuit 21. The A/D conversion circuit 21 has a DMA request function and is capable of outputting a DMA request signal to the DMAC 20 when the A/D conversion is finished. Further, the A/D conversion circuit 21 has an interrupt request function and is capable of requesting an interrupt to the interrupt controller 19 when the A/D conversion is finished.

The communication circuit 22 performs communications through an external interface. The communication circuit 22 has a transmission buffer and a reception buffer. The communication circuit 22 has a DMA request function and is capable of outputting a DMA request signal when the transmission buffer becomes empty or data remains in the reception buffer Further, the communication circuit 22 has an interrupt request function and is capable of requesting an interrupt to the interrupt controller 19 when the transmission buffer becomes empty or the data remains in the reception buffer.

[Memory Comparison Circuit]

The memory comparison circuit 23 compares two data to be compared. In the present embodiment, the memory comparison circuit 23 is configured as a dedicated circuit (dedicated hardware) for comparing data. The objects to be compared are assumed to be a memory (including each circuit mapped in memory space) versus single value, and a memory versus memory. The memory comparison circuit 23 is configured to be able to compare a data set including one or more data on a memory space and a fixed value (single value), for example. Further, the memory comparison circuit 23 is configured to be able to compare a data set including one or more data on the memory space with another data set including one or more data on the memory space. The memory comparison circuit 23 has an interrupt request function and is capable of requesting an interrupt to the interrupt controller 19 on conditions corresponding to the comparison result of data.

In the following description, a comparison condition for the comparison of data in the memory comparison circuit 23 is assumed to include "coincide", "not coincide", "large or equal", "large", "small or equal", and "small". Further, a comparing method is assumed to include a simple comparison and a comparison (error allowance comparison) allowing an error. Data sizes of data to be compared are assumed to be data sizes supported by the CPU core A 12 and the CPU core B 13, such as "8 bits", "16 bits", "32 bits", and "64 bits", etc. Data formats of data to be compared are assumed to include at least "no sign", "complement of 2", and "floating-point number". In the present embodiment, the result of comparison by the memory comparison circuit 23 is configured to be outputtable as, for example, a counter value indicative of a frequency coincident with the comparison condition, other than a flag indicative of whether the result coincides with a comparison condition like a T bit.

The memory comparison circuit 23 has a transfer control register 25, a DMA request circuit 26, a comparison control register 27, a buffer A 28, a buffer B 29, a comparison circuit 30, a condition coincidence frequency counter 31, a comparison frequency counter 32, an interrupt control register 33, and an interrupt request circuit 34. In the memory comparison circuit 23, the transfer control register 25, the comparison control register 27, the buffer A 28, the buffer B 29, the condition coincidence frequency counter 31, the comparison frequency counter 32, and the interrupt control register 33 are coupled to the peripheral bus 18 through an interface 24 provided inside the memory comparison circuit.

The transfer control register 25, the comparison control register 27, the buffer A 28, the buffer B 29, the condition coincidence frequency counter 31, the comparison frequency counter 32, and the interrupt control register 33 are mapped on the memory space. The CPU core A 12 and the CPU core B 13 are accessible to the transfer control register 25, the comparison control register 27, the buffer A 28, the buffer B 29, the condition coincidence frequency counter 31, the comparison frequency counter 32, and the interrupt control register 33 through the system bus 14, the peripheral bus controller 17, the peripheral bus 18, and the interface 24 inside the memory comparison circuit. Further, the DMAC 20 is accessible to at least the buffer A 28 and the buffer B 29 through the peripheral bus 18 and the interface 24 inside the memory comparison circuit.

The buffer A 28 and the buffer B 29 are buffers for storing the data to be compared. Data transferred by the DMAC 20 is stored in each of the buffer A 28 and the buffer B 29. Alternatively, data written by the CPU core A 12 or the CPU core B 13 is stored in each of the buffer A 28 and the buffer B 29. The comparison circuit 30 compares the data stored in the buffer A 28 with the data stored in the buffer B 29. The comparison circuit 30 compares two data to be compared according to, for example, a comparison condition selected from a plurality of comparison conditions.

The transfer control register 25 stores therein setting information related to the transfer of data to the buffer A 28 and the buffer B 29. The transfer control register 25 stores therein, for example, a transfer mode of data in DMA transfer (data transfer) executed by the DMAC 20, and a transfer frequency, etc. Further, the transfer control register 25 stores therein, for example, values for setting the start and stop of the data transfer.

The CPU core A 12 or CPU core B 13 writes a value for setting the start of the data transfer into the transfer control register 25 with a timing of causing the memory comparison circuit 23 to start a data comparison, for example. At this time, assume that the CPU core A 12 or the CPU core B 13 has already set the values of the various registers in the DMAC 20. When the value for setting the start of the data transfer is written into the transfer control register 25, the DMA request circuit 26 outputs a DMA request signal instructing the start of the data transfer to the DMAC 20. In the present embodiment, the DMAC 20 and the DMA request circuit 26 configure a transfer circuit for transferring the data on the memory space to the buffer A 28 and/or buffer B 29.

The comparison control register 27 stores therein setting information related to comparison contents (comparison conditions) in the comparison circuit 30. The comparison control register 27 stores therein comparison conditions such as "coincide", "not coincide", "large or equal", "large", "small or equal", or "small", etc. Further, the comparison control register 27 stores therein a value indicative of whether the comparison is a comparison that allows an error, and an allowable error where an error is allowed, etc. The comparison circuit 30 compares the data stored in the buffer A 28 with the data stored in the buffer B 29 according to the contents of the comparison control register 27.

The condition coincidence frequency counter 31 counts a frequency at which the comparison result coincides with the comparison condition in the comparison circuit 30. For example when the comparison condition is "coincide", the comparison condition coincidence frequency counter 31 counts a frequency at which the data stored in the buffer A 28 and the data stored in the buffer B 29 coincide. The comparison frequency counter 32 counts a comparison frequency of the data in the comparison circuit 30. Each time the comparison of the data is performed in the comparison circuit 30, for example, the comparison frequency counter 32 increments its value one by one.

The interrupt request circuit 34 requests an interrupt to the interrupt controller 19, based on at least one of the value of the condition coincidence frequency counter 31 and the value of the comparison frequency counter 32. The interrupt control register 33 stores therein setting information related to interrupt conditions in the interrupt request circuit 34. The interrupt control register 33 stores therein, for example, a setting of whether the interrupt request circuit 34 requests the interrupt, based on the value of any counter. The interrupt request circuit 34 determines based on the condition coincidence frequency counter 31, the comparison frequency counter 32, and the interrupt control register 33 whether the interrupt condition is established. When it is determined that the interrupt condition has been established, the interrupt request circuit 34 requests an interrupt to the interrupt controller 19.

[Memory Space]

Figure 2:
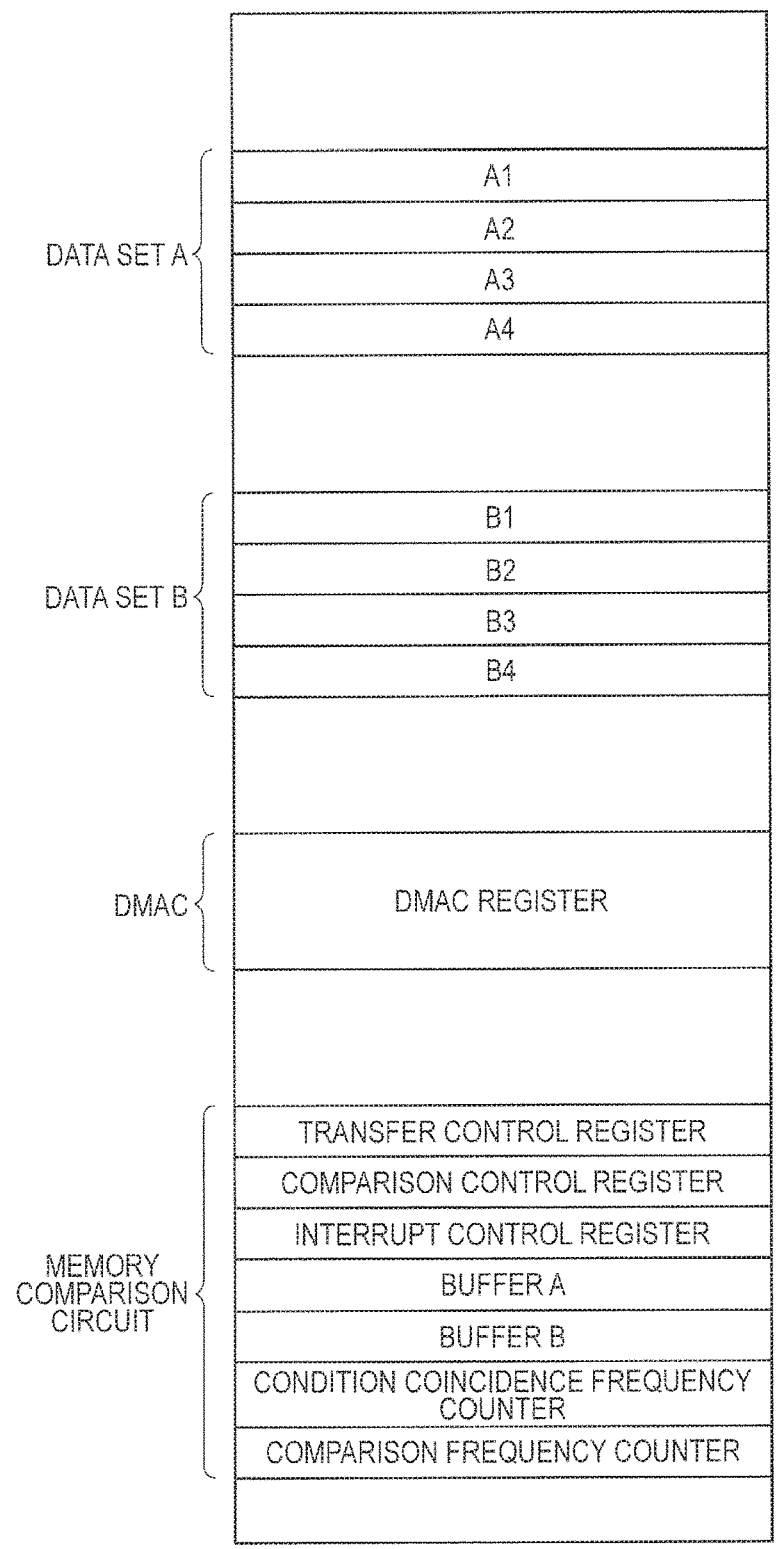
FIG. 2 is a diagram illustrating a memory space accessible from a CPU core.

FIG. 2 shows one example of a memory space. In the present embodiment, the on-chip memory 15 and the external memory 35 are assigned to prescribed addresses in the memory space. Further, the register (DMAC register) of the DMAC 20, and the transfer control register 25, comparison control register 27, buffer A 28, buffer B 29, condition coincidence frequency counter 31, comparison frequency counter 32 and interrupt control register 33 of the memory comparison circuit 23 are assigned to prescribed addresses in the memory space.

In the example of FIG. 2, a data set A and a data set B each including four data are respectively stored in a prescribed address range on the memory space. The data set A includes data A1, A2, A3, and A4. The data set B includes data B1, B2, B3, and B4. Each data of the data set A is, for example, data generated in prescribed processing by the CPU core A 12 and output to the corresponding memory. Further, each data of the data set B is, for example, data generated in the same processing by the CPU core B 13 and output to the corresponding memory. Each data of the data sets A and B is stored in the on-chip memory 15 or the external memory 35, for example.

For example, the CPU core A 12 or the CPU core B 13 writes information for transferring each data of the data set A to the buffer A 28 sequentially into the DMAC register. Also, the CPU core A 12 or the CPU core B 13 writes information for transferring each data of the data set B to the buffer B 29 sequentially into the DMAC register. Further, the CPU core A 12 or the CPU core B 13 writes setting information for the data transfer, setting information for the comparison conditions, and setting information for the interrupt conditions into the transfer control register 25, the comparison control register 27, and the interrupt control register 33, respectively.

When a value indicative of a transfer start is written into the transfer control register 25, the DMA request circuit 26 outputs a DMA request signal to the DMAC 20. The DMAC 20 sequentially reads the data of the data set A on the memory space and transfers the same to the buffer A 28. Further, the DMAC 20 sequentially reads the data of the data set B on the memory space and transfers the same to the buffer B 29. The DMAC 20 transfers the data A1 of the data set A to the buffer A 28 and transfers the data B1 of the data set B to the buffer B 29. When the data is transferred to both buffers, the comparison circuit 30 performs a data comparison and updates the condition coincidence frequency counter 31 and the comparison frequency counter 32. Subsequently, in the same way as above, the data transfer by the DMAC 20 and the comparison by the comparison circuit 30 are performed even on the data A2 and the data B2, the data A3 and the data B3, and the data A4 and the data B4.

[Transfer Control Register]

FIGS. 3A and 3B respectively show one example of the specification of the transfer control register 25. FIG. 3A shows a configuration example of fields of the transfer control register 25, and FIG. 3B shows the details of each field. As shown in FIG. 3A, the transfer control register 25 has, for example, fields ST, MA, MB, and C. Incidentally, the field configuration of the transfer control register 25 shown in FIG. 3A is illustrative. The field configuration of the transfer control register 25 is not limited to the one shown in the drawing.

As shown in FIG. 3B, the field ST (Start) is a field (transfer start setting field) for setting the start and stop of the DMA transfer. The value of "0" or "1" is set to the field ST. The value "0" indicates the stop, and the value "1" indicates the start. When the value set to the field ST becomes "1" from "0", the DMA request circuit 26 (refer to FIG. 1) outputs a DMA request signal to the DMAC 20, and hence the DMAC 20 starts data transfer to the buffer A 28 and/or buffer B 29.

The field MA (Mode A) is a field (transfer mode setting field) for setting a transfer mode of a channel A. Here, the channel A means the DMA transfer to the buffer A 28 in FIG.

1. The value of "0", "1" or "2" is set to the field MA. The value "0" indicates that there is no DMA transfer to the buffer A 28. The value "1" indicates that the frequency of the DMA transfer to the buffer A 28 is once. The value "2" indicates that the frequency of the DMA transfer to the buffer A 28 is the number of times (transfer frequency C) represented by the field C. The field C (Count) is a field (transfer frequency setting field) for setting the frequency of the DMA transfer.

The field MB (Mode B) is a field (transfer mode setting field) for setting a transfer mode of a channel B. Here, the channel B means the transfer to the buffer B 29 in FIG. 1. The value of "0", "1" or "2" is set to the field MB. The value "0" indicates that there is no DMA transfer to the buffer B 29. The value "1" indicates that the frequency of the DMA transfer to the buffer B 29 is once. The value "2" indicates that the frequency of the DMA transfer to the buffer B 29 is the number of times represented by the field C.

Here, when the value "0" or "1" is set to the field MA and the field MB, data stored in the buffer corresponding to its channel is handled as a fixed value in the data comparison. For example, when the value "0" indicating no DMA transfer is set to the field MA, data indicative of a prescribed value (fixed value) is written into the buffer A 28 by the CPU core A 12 or the CPU core B 13, for example. In that case, the fixed value written into the buffer A 28 becomes valid until the completion of comparison. Each time the data is DMA-transferred to the buffer B 29, the comparison circuit 30 compares the DMA-transferred data with the fixed value written into the buffer A 28.

Further, for example, when the value "1" indicating that the DMA transfer is once is set to the field MA, for example, data transferred by the DMAC 20, for example is written into buffer A 28 only once. In that case, the data transferred to the buffer A 28 is handled as a fixed value which becomes valid until the completion of comparison. Each time the data is DMA-transferred to the buffer B 29, the comparison circuit 30 compares the DMA-transferred data with the fixed value transferred to the buffer A 28. When the value "2" indicating that the transfer frequency is the number of times represented by the field C is set to both the fields MA and MB, the comparison circuit 30 performs a data comparison each time the data is DMA-transferred to the buffer A 28 and the data is DMA-transferred to the buffer B 29.

[Example of DMA Transfer]

Figure 4A:
FIGS. 4A through 4C are respectively timing charts showing an operation example of DMA transfer.
Figure 4B:
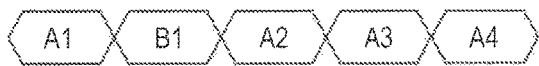
Figure 4C:

FIGS. 4A through 4C respectively show an operation example of DMA transfer. FIG. 4A shows an operation example of DMA transfer where the value of the field MA is set to "2", the value of the field MB is set to "0", and the value of the field C is set to "8". Information related to the DMA transfer of a data set A including data A1 through A8 is set to the DMAC 20 (refer to FIG. 1) in advance. When the DMA request circuit 26 outputs a DMA request signal, the DMAC 20 performs data transfer eight times in the channel A and sequentially transfers the data A1 through A8 to the buffer A 28. In the channel B, the value of the field MB is "0" indicative of no DMA transfer, and the DMA transfer to the buffer B 29 is not performed.

FIG. 4B shows an operation example of DMA transfer where the value of the field MA is set to "2", the value of the field MB is set to "1", and the value of the field C is set to "4". Information related to DMA transfer of a data set A including data A1 through A4, and information related to DMA transfer of data are set to the DMAC 20 in advance. When the DMA request circuit 26 outputs a DMA request signal, the DMAC 20 first transfers the data A1 to the buffer A 28 in the channel A, and then transfers the data B1 to the buffer B 29 in the channel B. Thereafter, the DMAC 20 sequentially transfers the data A2 through A4 to the buffer A 28 in the channel A.

FIG. 4C shows an operation example of DMA transfer where the value of the field MA is set to "2", the value of the field MB is set to "2", and the value of the field C is set to "4". Information related to DMA transfer of a data set A including data A1 through A4, and information related to DMA transfer of a data set B including data B1 through B4 are set to the DMAC 20 in advance. When the DMA request circuit 26 outputs a DMA request signal, the DMAC 20 first transfers the data A1 to the buffer A 28 in the channel A, and then transfers the data B1 to the buffer B 29 in the channel B. Thereafter, the DMAC 20 alternately performs the data transfer of the channel A and the data transfer of the channel B and sequentially transfers the data A2 through A4 and the data B2 through B4 to the buffer A 28 and the buffer B 29.

[Comparison Control Register]

FIGS. 5A and 5B respectively show one example of the specification of the comparison control register 27. FIG. 5A shows a configuration example of fields of the comparison control register, and FIG. 5B shows the details of each field. As shown in FIG. 5A, the comparison control register 27 has, for example, fields ST, C, M, DS, DF, and AE. Incidentally, the field configuration of the comparison control register 27 shown in each of FIGS. 5A and 5B is illustrative. The field configuration of the comparison control register 27 is not limited to the one shown in the drawing.

As shown in FIG. 5B, the field ST (Start) is a field for setting the start and stop of comparison in the comparison circuit 30 (refer to FIG. 1). The value of "0" or "1" is set to the field ST. The value "0" indicates the stop, and the value "1" indicates the start. When the value set to the field ST becomes "1" from "0", the comparison circuit 30 starts comparison between the data stored in the buffer A 28 and the data stored in the buffer B 29.

The field C (Condition) is a field (comparison condition setting field) for setting a comparison condition. The values of "0" through "5" are set to the field C. When the data stored in the buffer A 28 is assumed to be A, and the data stored in the buffer B 29 is assumed to be B, the value "0" indicates that the comparison condition is A=B. The value "1" indicates that the comparison condition is A≠B. The value "2" indicates that the comparison condition is A≥B. The value "3" indicates that the comparison condition is A>B. The value "4" indicates that the comparison condition is A≤B. The value "5" indicates that the comparison condition is A<B.

The field M (Method) is a field (comparison method setting field) for setting a comparing method. The value of "0" or "1" is set to the field M. The value "0" indicates a simple comparison which does not allow an error. The value "1" indicates an error allowance comparison. The field AE (Allowable Error) is a field (allowable error setting field) for setting an allowable error. A value indicative of an allowable error is set to the field AE. The value of the field AE is set where the field M is "1", for example.

The field DS (Data Size) is a field (data size setting field) for setting the data size of data to be compared. The values of "0" through "3" are set to the field DS. The value "0" indicates that the data size is 8 bits. The value "1" indicates that the data size is 16 bits. The value "2" indicates that the data size is 32 bits. The value "3" indicates that the data size is 64 bits.

The field DF (Data Format) is a field (data format setting field) for setting a data format of data to be compared. The value "0", "1", or "2" is set to the field DF. The value "0"

indicates that the data is data with no sign. The value "1" indicates that the data is represented by the complement of 2. The value "2" indicates that the data is represented with a floating-point.

[Operation Example of Data Comparison]

FIGS. 6A-6D show an operation example of each data comparison. FIG. 6A shows DMA transfer (data transfer), FIG. 6B shows data stored in the buffer A 28, FIG. 6C shows data stored in the buffer B 29, and FIG. 6D shows a comparison operation in the comparison circuit 30. The data transfer (refer to FIG. 6A) in corresponds to the data transfer shown in FIG. 4A. In the present example, in the transfer control register 25, the value of the field MA is set to "2", the value of the field MB is set to "0", and the value of the field C is set to "8". Data B0 is assumed to have been written into the buffer B 29 in advance by the CPU core A 12 or the CPU core B 13, for example (refer to FIG. 6C). Since the value of the field MB is set to "0", the data B0 stored in the buffer B 29 is handled as a fixed value.

The DMAC 20 starts data transfer at a time t10 and reads data A1 from the on-chip memory 15 (refer to FIG. 1), for example (refer to FIG. 6A). The DMAC 20 transfers the data A1 to the buffer A 28 at a time t11 and writes the data A1 into the buffer A 28. (refer to FIG. 6B). After the data A1 is transferred to the buffer A 28, the comparison circuit 30 performs a first data comparison at a time t12 (refer to FIG. 6D). In the first data comparison, the comparison circuit 30 compares the data A1 stored in the buffer A 28 with the data B0 stored in the buffer B 29.

After the execution of the data comparison, the comparison circuit 30 handles, for example, the data stored in the buffer A 28 as invalid data until the next data is written. Since the data B0 stored in the buffer B 29 is of the fixed value, the data is not made invalid until the data comparison is completed. The comparison circuit 30 updates the comparison frequency counter 32 when the data comparison is done. Further, the comparison circuit 30 updates the condition coincidence frequency counter 31 according to the result of the comparison.

The DMAC 20 starts the next data transfer at a time t13 and reads data A2 from the on-chip memory 15, for example (refer to FIG. 6A). The DMAC 20 transfers the next data A2 to the buffer A 28 at a time t14 (refer to FIG. 6B). When the next data A2 is transferred to the buffer A 28, the comparison circuit 30 performs a second data comparison at a time t15 (refer to FIG. 6D). In the second data comparison, the comparison circuit 30 compares the data A2 stored in the buffer A 28 and the data B0 stored in the buffer B 29. When the data comparison is performed, the comparison circuit 30 updates the condition coincidence frequency counter 31 and the comparison frequency counter 32.

Subsequently, in the same manner as above, data A3 through A8 are sequentially transferred to the buffer A 28 (refer to FIG. 6B). Each time new data is transferred to the buffer A 28, the comparison circuit 30 compares the data A3 through A8 transferred to the buffer A 28 and the data B0 stored in the buffer B 29 (refer to FIG. 6D). When the data comparison is performed by the number of times corresponding to the value "8" of the field C of the transfer control register 25, the comparison circuit 30 finishes the comparison operation. In other words, when the data A8 stored in the buffer A 28 and the data B0 stored in the buffer B 29 are compared in an eighth data comparison, the comparison circuit 30 finishes the comparison operation.

FIGS. 7A-7D show another operation example of each data comparison. FIG. 7A shows DMA transfer (data transfer), FIG. 7B shows data stored in the buffer A 28, FIG. 7C shows data stored in the buffer B 29, and FIG. 7D shows a comparison operation in the comparison circuit 30. The data transfer (refer to FIG. 7A) corresponds to the data transfer shown in FIG. 4B. In this example, in the transfer control register 25, the value of the field MA is set to "2", the value of the field MB is set to "1", and the value of the field C is set to "4".

The DMAC 20 starts data transfer at a time t20 and reads data A1 from the on-chip memory 15, for example (refer to FIG. 7A). The DMAC 20 transfers the data A1 to the buffer A 28 at a time t21 and writes the data A1 into the buffer A 28. (refer to FIG. 7B). Then, the DMAC 20 reads data B1 from the on-chip memory 15, for example at a time t22 (refer to FIG. 7A) and transfers the data B1 to the buffer B 29 at a time t23 (refer to FIG. 7C). After the data A1 is transferred to the buffer A 28 and the data B1 is transferred to the buffer B 29, the comparison circuit 30 performs a first data comparison at a time t24 (refer to FIG. 7D). In the first data comparison, the comparison circuit 30 compares the data A1 stored in the buffer A 28 and the data B1 stored in the buffer B 29.

Here, since the value of the field MB of the transfer control register 25 is "1", the comparison circuit 30 handles the data B1 stored in the buffer B 29 as a fixed value. After the execution of the data comparison, the comparison circuit 30 handles, for example, the data stored in the buffer A 28 as invalid data until the next data is written. Since the data B1 stored in the buffer B 29 is of the fixed value, the data is not made invalid until the data comparison is completed. The comparison circuit 30 updates the comparison frequency counter 32 when the data comparison is done. Further, the comparison circuit 30 updates the condition coincidence frequency counter 31 according to the result of the comparison.

The DMAC 20 starts the next data transfer at a time t25 and reads data A2 from the on-chip memory 15, for example (refer to FIG. 7A). The DMAC 20 transfers the next data A2 to the buffer A 28 at a time t26 (refer to FIG. 7B). When the next data A2 is transferred to the buffer A 28, the comparison circuit 30 performs a second data comparison at a time t27 (refer to FIG. 7D). In the second data comparison, the comparison circuit 30 compares the data A2 stored in the buffer A 28 and the data B1 stored in the buffer B 29. When the data comparison is performed, the comparison circuit 30 updates the condition coincidence frequency counter 31 and the comparison frequency counter 32.

Subsequently, in the same manner as above, data A3 and A4 are sequentially transferred to the buffer A 28 (refer to FIG. 7B). The comparison circuit 30 sequentially compares the data A3 and A4 transferred to the buffer A 28 and the data B1 stored in the buffer B 29 (refer to FIG. 7D). When the data comparison is performed by the number of times corresponding to the value "4" of the field C of the transfer control register 25, the comparison circuit 30 finishes the comparison operation. In other words, when the data A4 stored in the buffer A 28 and the data B1 stored in the buffer B 29 are compared in a fourth data comparison, the comparison circuit 30 finishes the comparison operation.

FIGS. 8A-8D show a further operation example of each data comparison. FIG. 8A shows DMA transfer (data transfer), FIG. 8B shows data stored in the buffer A 28, FIG. 8C shows data stored in the buffer B 29, and FIG. 8D shows a comparison operation in the comparison circuit 30. The data transfer (refer to FIG. 8A) in corresponds to the data transfer shown in FIG. 4C. In this example, in the transfer control register 25, the value of the field MA is set to "2", the value of the field MB is set to "2", and the value of the field C is set to "4".

The DMAC 20 starts data transfer at a time t30 and reads data A1 from the on-chip memory 15, for example (refer to FIG. 8A). The DMAC 20 transfers the data A1 to the buffer A 28 at a time t31 and writes the data A1 into the buffer A 28. (refer to FIG. B8). Then, the DMAC 20 reads data B1 from the on-chip memory 15, for example at a time t32 (refer to FIG. 8A) and transfers the data B1 to the buffer B 29 at a time t33 (refer to FIG. 8C).

After the data A1 is transferred to the buffer A 28 and the data B1 is transferred to the buffer B 29, the comparison circuit 30 performs a first data comparison at a time t34 (refer to FIG. 8D). In the first data comparison, the comparison circuit 30 compares the data A1 stored in the buffer A 28 with the data B1 stored in the buffer B 29. After the execution of the data comparison, the comparison circuit 30 handles, for example, the data stored in the buffer A 28 and buffer B 29 respectively as invalid data until the next data is written. The comparison circuit 30 updates the comparison frequency counter 32 when the data comparison is performed. Further, the comparison circuit 30 updates the condition coincidence frequency counter 31 according to the result of the comparison.

The DMAC 20 starts the next data transfer at a time t35 and reads data A2 from the on-chip memory 15, for example (refer to FIG. 8A). The DMAC 20 transfers the next data A2 to the buffer A 28 at a time t36 (refer to FIG. 8B). Further, the DMAC 20 reads the next data B2 from the on-chip memory 15, for example at a time t37 (refer to FIG. 8A) and transfers the next data B2 to the buffer B 29 at a time t35 (refer to FIG. 8C). When the next data A2 is transferred to the buffer A 28, and the next data B2 is transferred to the buffer B 29, the comparison circuit 30 performs a second data comparison at a time t39 (refer to FIG. 8D). In the second data comparison, the comparison circuit 30 compares the data A2 stored in the buffer A 28 with the data B2 stored in the buffer B 29. When the data comparison is performed, the comparison circuit 30 updates the condition coincidence frequency counter 31 and the comparison frequency counter 32.

Subsequently, in the same manner as above, data A3 and A4 are sequentially transferred to the buffer A 28 (refer to FIG. 8B), and data B3 and B4 are sequentially transferred to the buffer B 29 (refer to FIG. 8C). Each time the data is transferred to the buffer A 28 and the buffer B 29, the comparison circuit 30 compares the data A3 and A4 transferred to the buffer A 28 and the data B3 and B4 transferred to the buffer B 29 (refer to FIG. 8D). When the data comparison is performed by the number of times corresponding to the value "4" of the field C of the transfer control register 25, the comparison circuit 30 finishes the comparison operation. In other words, when the data A4 stored in the buffer A 28 and the data B4 stored in the buffer B 29 are compared in a fourth data comparison, the comparison circuit 30 finishes the comparison operation.

[Comparison Circuit]

FIG. 9 shows a configuration example of the comparison circuit 30. The comparison circuit 30 includes a flag register A 300, a flag register B 301, a comparison execution signal generating circuit 302, a clear signal generating circuit 303, a sign extension circuit A 304, a sign extension circuit B 305, and a condition coincidence determining circuit 306. The respective parts in the comparison circuit 30 are respectively configured of, for example, a hardware circuit.

The flag register A 300 stores therein a value indicating that the buffer A 28 is valid, or a value indicating that the buffer A 28 is invalid. For example, when the buffer A 28 is valid, that is, valid data exists in the buffer A 28, a value "1" is stored in the flag register A 300. When the buffer A 28 is invalid, that is, no valid data exists in the buffer A 28, a value "0" is stored in the flag register A 300. For example, when a write signal to the buffer A 28 is asserted, the value of the flag register A 300 is set to "1".

The flag register B 301 stores therein a value indicating that the buffer B 29 is valid, or a value indicating that the buffer B 29 is invalid. For example, when the buffer B 29 is valid, that is, valid data exists in the buffer B 29, a value "1" is stored in the flag register B 301. When the buffer B 29 is invalid, that is, no valid data exists in the buffer B 29, a value "0" is stored in the flag register B 301. For example, when a write signal to the buffer B 29 is asserted, the value of the flag register B 301 is set to "1".

The comparison execution signal generating circuit 302 outputs a comparison execution signal. The comparison execution signal generating circuit 302 outputs logical AND of the flag register A 300, the flag register B 301, and the field ST (refer to FIG. 5B) of the comparison control register 27, for example, as the comparison execution signal. When the value of the field ST of the comparison control register 27 is "1" indicative of a comparison start, the value of the flag register A 300 is a value "1" indicative of buffer validity, and the value of the flag register B 301 is "1" indicative of buffer validity, the comparison execution signal generating circuit 302 outputs a comparison execution signal "1" indicating that the data comparison is executed. In the case other than it, the comparison execution signal generating circuit 302 outputs a comparison execution signal "0" indicating that no data comparison is carried out. Each time the comparison execution signal is changed from the value "0" to the value "1", the comparison frequency counter 32 increments a count value one by one.

The clear signal generating circuit 303 generates a clear signal for clearing the value indicating that the data is valid, which is set to the flag register A 300 and the flag register B 301. When the data transfer of the transfer frequency C is performed in the channels A and B, the clear signal generating circuit 303 outputs a clear signal to the flag register A 300 and the flag register B 301 each time the data comparison is executed. When the number of times of the data transfer in the channels A and B is 0 or 1, the clear signal generating circuit 303 outputs a clear signal to the flag register A 300 and the flag register B 301 after the last data comparison is executed.

When the value of the field MA (refer to FIG. 3B) of the transfer control register 25 is "2" indicative of the transfer frequency C, for example, the clear signal generating circuit 303 outputs a clear signal to the flag register A 300 when the value of the comparison execution signal is changed from "0" to "1". Further, when the value of the field MA of the transfer control register 25 is other than "2", the clear signal generating circuit 303 outputs a clear signal to the flag register A 300 when the value of the comparison execution signal is changed from "0" to"1" where the count value of the comparison frequency counter 32 is smaller by one than the value of the field C of the transfer control register 25.

When the value of the field MB of the transfer control register 25 is "2", for example, the clear signal generating circuit 303 outputs a clear signal to the flag register B 301 when the value of the comparison execution signal is changed from "0" to "1". Further, when the value of the field MB of the transfer control register 25 is other than "2", the clear signal generating circuit 303 outputs a clear signal to the flag register B 301 when the value of the comparison execution signal is changed from "0" to "1" where the value of the comparison frequency counter 32 is smaller by one than the value of the field C of the transfer control register 25.

The sign extension circuit A 304 sign-extends the data stored in the buffer A 28 to data of a prescribed number of bits, e.g., data of 65 bits. The sign extension circuit B 305 sign-extends the data stored in the buffer B 29 to, for example, data of 65 bits. Variations of the data stored in the buffers A 28 and B 29 include four types of data sizes of, for example, 8 bits, 16 bits, 32 bits, and 64 bits, and include three types of data formats of, for example, no sign, the complement of 2, and a floating point. The sign extension circuit A 304 and the sign extension circuit B 305 unify data different in data size and data format to data represented by the complement of 2 of 65 bits, for example to thereby facilitate the data comparison.

The condition coincidence determining circuit 306 compares the data (data A) sign-extended by the sign extension circuit A 304 and the data (data B) sign-extended by the sign extension circuit B 305. When the values of the flag registers A 300 and B 301 are "1", the condition coincidence determining circuit 306 compares the data A and the data B. At that time, the condition coincidence determining circuit 306 compares the data A and the data B by a comparison condition following the value of the field C of the comparison control register 27 and a comparing method following the value of the field M.

For example, when the value of the field M of the comparison control register 27 is a value "1" indicative of an error allowance comparison, the condition coincidence determining circuit 306 performs a data comparison allowing an error with the value of the field AE as an allowable error. The condition coincidence determining circuit 306 determines whether the relationship between the data A and the data B coincides with the comparison condition represented by the value of the field C upon the data comparison. The condition coincidence determining circuit 306 determines, for example, the difference between the data A and the data B and determines according to the magnitude of the difference and its sign whether the relationship coincides with the comparison condition. When it is determined that it coincides with the comparison condition, the condition coincidence determining circuit 306 outputs a condition coincidence signal. Each time the condition coincidence signal is output, the condition coincidence frequency counter increments a count value one by one.

[Specific Examples of Sign Extension]

FIGS. 10A through 10D respectively show a specific example of sign extension to sign-free data. Here, the data stored in the buffers A 28 and B 29 will be simply called buffer data. The data size of post-sign extension data is 65 bits. This data is assumed to be represented by the complement of 2.

FIG. 10A shows an example of sign extension where the data size of the buffer data is 8 bits. When the field DS of the comparison control register 27 is a value "0" indicating that the data size is 8 bits, and the field DF thereof is a value "0" indicative of no sign, the sign extension circuit A 304 and the sign extension circuit B 305 (hereinafter simply called sign extension circuit) arrange bits 0 through 7 of the buffer data in bits 0 through 7 of the post-sign extension data as illustrated in FIG. 10A. Further, the sign extension circuit sets all of bits 8 through 64 of the post-sign extension data to a bit value "0".

FIG. 10B shows an example of sign extension where the data size is 16 bits. When the field DS of the comparison control register 27 is a value "1" indicating that the data size is 16 bits, and the field DF thereof is a value "0" indicative of no sign, the sign extension circuit arranges bits 0 through 15 of the buffer data in bits 0 through 15 of the post-sign extension data as shown in FIG. 10B. Further, the sign extension circuit sets all of bits 16 through 64 of the post-sign extension data to a bit value "0".

FIG. 10C shows an example of sign extension where the data size is 32 bits. When the data field DS of the comparison control register 27 is a value "2" indicating that the data size is 32 bits, and the field DF thereof is a value "0" indicative of no sign, the sign extension circuit arranges bits 0 through 31 of the buffer data in bits 0 through 31 of the post-sign extension data as shown in FIG. 10C. Further, the sign extension circuit sets all of bits 32 through 54 of the post-sign extension data to a bit value "0".

FIG. 10D shows an example of sign extension where the data size is 64 bits. When the data field DS of the comparison control register 27 is a value "3" indicating that the data size is 64 bits, and the field DF thereof is a value "0" indicative of no sign, the sign extension circuit arranges bits 0 through 63 of the buffer data in bits 0 through 63 of the post-sign extension data as shown in FIG. 10D. Further, the sign extension circuit sets 64 bits of the post-sign extension data to a bit value "0".

FIGS. 11A through 11D respectively show a specific example of sign extension to data represented by the complement of 2. FIG. 11A shows sign extension where the data size is 8 bits. When the field DS of the comparison control register 27 is a value "0" indicating that the data size is 8 bits, and the field DF thereof is a value "1" indicative of the complement of 2, the sign extension circuit arranges bits 0 through 7 of buffer data in bits 0 through 7 of post-sign extension data as shown in FIG. 11A. Further, the sign extension circuit sets all of bits 8 through 64 of the post-sign extension data to the value of the bit 7 of the buffer data.

FIG. 11B shows an example of sign extension where the data size is 16 bits. When the field DS of the comparison control register 27 is a value "1" indicating that the data size is 16 bits, and the field DF thereof is a value "1" indicative of the complement of 2, the sign extension circuit arranges bits 0 through 15 of buffer data in bits 0 through 15 of post-sign extension data as shown in FIG. 11B. Further, the sign extension circuit sets all of bits 16 through 64 of the post-sign extension data to the value of the bit 15 of the buffer data.

FIG. 11C shows an example of sign extension where the data size is 32 bits. When the field DS of the comparison control register 27 is a value "2" indicating that the data size is 32 bits, and the field DF thereof is a value "1" indicative of the complement of 2, the sign extension circuit arranges bits 0 through 31 of buffer data in bits 0 through 31 of post-sign extension data as shown in FIG. 11C. Further, the sign extension circuit sets all of bits 32 through 64 of the post-sign extension data to the value of the bit 31 of the buffer data.

FIG. 11D shows an example of sign extension where the data size is 64 bits. When the field DS of the comparison control register 27 is a value "3" indicating that the data size is 64 bits, and the field DF thereof is a value "1" indicative of the complement of 2, the sign extension circuit arranges bits 0 through 63 of buffer data in bits 0 through 63 of post-sign extension data as shown in FIG. 11D. Further, the sign extension circuit sets bits 64 of the post-sign extension data to the value of the bit 63 of the buffer data.

FIGS. 12A through 12D respectively show a specific example of sign extension to data represented by the floating point. FIG. 12A shows an example of sign extension where the data size is 8 bits. When the field DS of the comparison control register 27 is a value "0" indicating that the data size is 8 bits, and the field DF thereof is a value "2" indicative of the floating point, the sign extension circuit first arranges bits 0 through 6 of buffer data in bits 0 through 6 of post-sign extension data and sets all of bits 7 through 64 of the post-sign extension data to a value "0", as shown in FIG. 12A. Then, the sign extension circuit checks the value of the bit 7 of the buffer data. When the value of the bit 7 is "1", the sign extension circuit defines one obtained by inverting the data of the above 65 bits and adding the value "1" to the bit 0, as post-sign extension data.

FIG. 12B shows an example of sign extension where the data size is 16 bits. When the field DS of the comparison control register 27 is a value "1" indicating that the data size is 16 bits, and the field DE thereof is a value "2" indicative of the floating point, the sign extension circuit first arranges bits 0 through 14 of buffer data in bits 0 through 14 of post-sign extension data and sets all of bits 15 through 64 of the post-sign extension data to a value "0", as shown in FIG. 12B. Then, the sign extension circuit checks the value of the bit 15 of the buffer data. When the value of the bit 15 is "1", the sign extension circuit defines one obtained by inverting the data of the above 65 bits and adding the value "1" to the bit 0 as post-sign extension data.

FIG. 12C shows an example of sign extension where the data size is 32 bits. When the field DS of the comparison control register 27 is a value "2" indicating that the data size is 32 bits, and the field DF thereof is a value "2" indicative of the floating point, the sign extension circuit first arranges bits 0 through 30 of buffer data in bits 0 through 30 of post-sign extension data and sets all of bits 31 through 64 of the post-sign extension data to a value "0", as shown in FIG. 12C. Then, the sign extension circuit checks the value of the bit 31 of the buffer data. When the value of the bit 31 is "1", the sign extension circuit defines one obtained by inverting the data of the above 65 bits and adding the value "1" to the bit 0 as post-sign extension data.

FIG. 12D shows an example of sign extension where the data size is 64 bits. When the field DS of the comparison control register 27 is a value "3" indicating that the data size is 64 bits, and the field DF thereof is a value "2" indicative of the floating point, the sign extension circuit first arranges bits 0 through 62 of buffer data in bits 0 through 62 of post-sign extension data and sets bits 63 and 64 of the post-sign extension data to a value "0", as shown in FIG. 12D. Then, the sign extension circuit checks the value of the bit 63 of the buffer data. When the value of the bit 63 is "1", the sign extension circuit defines one obtained by inverting the data of the above 65 bits and adding the value "1" to the bit 0 as post-sign extension data.

[Condition Coincidence Determining Circuit]

FIG. 13 shows a function table of the condition coincidence determining circuit 306. The relationship between the data A and B for causing the condition coincidence signal to become "1" where the comparing method is a simple comparison, i.e., the field M of the comparison control register 27 is a value "0" is shown in Nos. 0 through 5 of the table shown in FIG. 13. Also, the values of the data A, data B, and field AE (hereinafter also called allowable error AE) for causing the condition coincidence signal to become "1" where the comparing method is an error allowance comparison, i.e., the value of the field M of the comparison control register 27 is "1" are shown in Nos. 6 through 11. When the relationship between the data A, data B and allowable error AE does not correspond to the relationship shown in Nos. 0 through 11, the condition coincidence signal becomes "0" as shown as No. 12.

When the comparing method is the simple comparison, and the value of the field C of the comparison control register 27 is "0", the comparison condition is given with the data A and the data B being equal to each other, and the condition coincidence determining circuit 306 outputs a condition coincidence signal "1" when data A=data B (refer to No. 0). For example, when the difference between the data A and B is 0, the condition coincidence determining circuit 306 outputs a condition coincidence signal "1". When data A=data B is not taken, the condition coincidence determining circuit 306 outputs the condition coincidence signal "0" (refer to No. 12).

When the comparing method is the simple comparison, and the value of the field C of the comparison control register 27 is "1", the comparison condition is given with the data A and the data B being not equal to each other, and the condition coincidence determining circuit 306 outputs the condition coincidence signal "1" where data A≠data B (refer to No. 1). For example, when the difference between the data A and B is not 0, the condition coincidence determining circuit 306 outputs the condition coincidence signal "1". When the data A≠data B is not taken, the condition coincidence determining circuit 306 outputs the condition coincidence signal "0" (refer to No. 12).

When the comparing method is the simple comparison, and the value of the field C of the comparison control register 27 is "2", the comparison condition is given with the data A being equal to or larger than the data B, and the condition coincidence determining circuit 306 outputs the condition coincidence signal "1" where data A≥data B (refer to No. 2). For example, when a difference obtained by subtracting the data B from the data A is 0 or the sign of the difference is positive, the condition coincidence determining circuit 306 outputs the condition coincidence signal "1". When data A≥data B is not taken, the condition coincidence determining circuit 306 outputs the condition coincidence signal "0" (refer to No. 12).

When the comparing method is the simple comparison, and the value of the field C of the comparison control register 27 is "3", the comparison condition is given with the data A being larger than the data B, and the condition coincidence determining circuit 306 outputs the condition coincidence signal "1" where data A>data B (refer to No. 3). For example, when the absolute value of the difference obtained by subtracting the data B from the data A is larger than 0 and the sign of the difference is positive, the condition coincidence determining circuit 306 outputs the condition coincidence signal "1". When data A>data B is not taken, the condition coincidence determining circuit 306 outputs the condition coincidence signal "0" (refer to No. 12).

When the comparing method is the simple comparison, and the value of the field C of the comparison control register 27 is "4", the comparison condition is given with the data A being equal to or smaller than the data B, and the condition coincidence determining circuit 306 outputs the condition coincidence signal "1" where data A≤data B (refer to No. 4). For example, when the difference obtained by subtracting the data B from the data A is 0 or the sign of the difference is negative, the condition coincidence determining circuit 306 outputs the condition coincidence signal "1". When data A≤data B is not taken, the condition coincidence determining circuit 306 outputs the condition coincidence signal "0" (refer to No. 12).

When the comparing method is the simple comparison, and the value of the field C of the comparison control register 27 is "5", the comparison condition is given with the data A being smaller than the data B, and the condition coincidence determining circuit 306 outputs the condition coincidence signal "1" where data A<data B (refer to No. 5). For example, when the absolute value of the difference obtained by subtracting the data B from the data A is larger than 0 and the sign of the difference is negative, the condition coincidence determining circuit 306 outputs the condition coincidence signal "1". When data A<data B is not taken, the condition coincidence determining circuit 306 outputs the condition coincidence signal "0" (refer to No. 12).

When the comparing method is the error allowance comparison, and the value of the field C of the comparison control register 27 is "0", the comparison condition is given with an error being allowed and the data A and B being equal to each other, and the condition coincidence determining circuit 306 outputs the condition coincidence signal "1" where |data A−data B|≤allowable error AE (refer to No. 6). The condition coincidence determining circuit 306 outputs the condition coincidence signal "0" where |data A−data B|≤allowable error AE is not taken (refer to No. 12).

When the comparing method is the error allowance comparison, and the value of the field C of the comparison control register 27 is "1", the comparison condition is given with an error being allowed and the data A and B being not equal to each other, and the condition coincidence determining circuit 306 outputs the condition coincidence signal "1" where |data A−data B|>allowable error AE (refer to No. 7). The condition coincidence determining circuit 306 outputs the condition coincidence signal "0" where |data A−data B|>allowable error AE is not taken (refer to No. 12).

When the comparison method is the error allowance comparison, and the value of the field C of the comparison control register 27 is "2", the comparison condition is given with an error being allowed and the data A being equal to or larger than the data B, and the condition coincidence determining circuit 306 outputs the condition coincidence signal "1" where data A≥data B−allowable error AE (refer to No. 8). For example, when the data A is greater than a value obtained by subtracting the allowable error from the data B, the condition coincidence determining circuit 306 outputs the condition coincidence signal "1". When data A≥data B−allowable error AE is not taken, the condition coincidence determining circuit 306 outputs the condition coincidence signal "0" (refer to No. 12).

When the comparing method is the error allowance comparison, and the value of the field C of the comparison control register 27 is "3", the comparison condition is given with an error being allowed and the data A being larger than the data B, and the condition coincidence determining circuit 306 outputs the condition coincidence signal "1" where data A>data B−allowable error AE (refer to No. 9). For example, when the data A is larger than a value obtained by subtracting the allowable error from the data B, the condition coincidence determining circuit 306 outputs the condition coincidence signal "1". When data A>data B−allowable error AE is not taken, the condition coincidence determining circuit 306 outputs the condition coincidence signal "0" (refer to No. 12).

When the comparing method is the error allowance comparison, and the value of the field C of the comparison control register 27 is "4", the comparison condition is given with an error being allowed and the data A being equal to or smaller than the data B, and the condition coincidence determining circuit 306 outputs the condition coincidence signal "1" where data A≤data B+allowable error AE (refer to No. 10). For example, when the data A is not greater than a value obtained by adding the allowable error to the data B, the condition coincidence determining circuit 306 outputs the condition coincidence signal "1". When data A≤data B+allowable error AE is not taken, the condition coincidence determining circuit 306 outputs the condition coincidence signal "0" (refer to No. 12).

When the comparing method is the error allowance comparison, and the value of the field C of the comparison control register 27 is "5", the comparison condition is given with an error being allowed and the data A being smaller than the data B, and the condition coincidence determining circuit 306 outputs the condition coincidence signal "1" where data A<data B+allowable error AE (refer to No. 11). For example, when the data A is smaller than a value obtained by adding the allowable error to the data B, the condition coincidence determining circuit 306 outputs the condition coincidence signal "1". When data A<data B+allowable error AE is not taken, the condition coincidence determining circuit 306 out guts the condition coincidence signal "0" (refer to No. 12).

The hardware circuit which performs the condition coincidence determinations following the function table shown in FIG. 13 can be generated by, for example, describing the function table shown in FIG. 13 using case sentences or the like in a hardware description language and synthesizing logics.

[Operation Example]

FIG. 14 shows the value of the condition coincidence frequency counter 31 where the simple comparison is performed. Consider here where the comparison condition is data A=data B, the data size of data stored in each of the buffers A 28 and B 29 is 8 bits, and the data format is the complement of 2. The data (decimal number) respectively stored in the buffers A 28 and B 29, and the value of the condition coincidence frequency counter where the data transfer is performed six times in the channels A and B respectively are shown in FIG. 14.

Since the data (value) stored in the buffer A 28 and the value stored in the buffer B 29 are different in the first and second comparisons, the condition coincidence determining circuit 306 outputs a condition coincidence signal "0". In this case, the condition coincidence frequency counter 31 does not perform a countup, and its count value remains at an initial value "0". In the third comparison, the condition coincidence determining circuit 306 determines that the value stored in the buffer A 28 and the value stored in the buffer B 29 coincide, and outputs a condition coincidence signal "1". When the condition coincidence signal "1" is output, the condition coincidence frequency counter 31 counts up the count value to "1".

Since the value stored in the buffer A 28 and the value shred in the buffer B 29 are different in the fourth and fifth comparisons, the condition coincidence determining circuit 306 outputs the condition coincidence signal "0", and the count value of the condition coincidence frequency counter 31 remains at "1". In the sixth comparison, the condition coincidence determining circuit 306 determines that the value stored in the buffer A 28 and the value stored in the buffer B 29 coincide, and outputs the condition coincidence signal "1". When the condition coincidence signal "1" is output, the condition coincidence frequency counter 31 counts up the count value to "2".

FIG. 15 shows the value of the condition coincidence frequency counter 31 where the error allowance comparison is performed. Consider here where the comparison condition is data A=data B, the data size of data stored in each of the buffers A 28 and B 29 is 8 bits, and the data format is the complement of 2. Further, the allowable error AE is assumed to be "3". The data (decimal number) respectively stored in the buffers A 28 and B 29, and the value of the condition coincidence frequency counter where the data transfer is performed six times in the channels A and B respectively are shown in FIG. 15 as with the example of FIG. 14.

Since in the first comparison, the value stored in the buffer A 28 and the value stored in the buffer B 29 are different, and the absolute value of its difference exceeds the allowable error AE "3", the condition coincidence determining circuit 306 outputs the condition coincidence signal "0". In this case, the condition coincidence frequency counter 31 does not perform a countup, and its count value remains at an initial value "0". Since in the second comparison, the value stored in the buffer A 28 and the value stored in the buffer B 29 are different, but the absolute value of its difference is the allowable error AE "3" or less, the condition coincidence determining circuit 306 outputs the condition coincidence signal "1". When the condition coincidence signal "1" is output, the condition coincidence frequency counter 31 counts up the count value to "1".

Since in the third comparison, the value stored in the buffer A 28 and the value stored in the buffer B 29 are equal to each other, the condition coincidence determining circuit 306 outputs the condition coincidence signal "1". Further, since in the fourth comparison, the value stored in the buffer A 28 and the value stored in the buffer B 29 are different, but the absolute value of its difference is the allowable error AE "3" or less, the condition coincidence determining circuit 306 outputs the condition coincidence signal "1". When the condition coincidence signal "1" is output in the third comparison, the condition coincidence frequency counter 31 counts up its count value to "2". Further, when the condition coincidence signal "1" is output in the fourth comparison, the condition coincidence frequency counter 31 counts up the count value to "3".

Since in the fifth comparison, the value stored in the buffer A 28 and the value stored in the buffer B 29 are different, and the absolute value of its difference exceeds the allowable error AE "3", the condition coincidence determining circuit 306 outputs the condition coincidence signal "0", and the count value of the condition coincidence frequency counter 31 remains at "3". In the sixth comparison, the condition coincidence determining circuit 306 determines that the value stored in the buffer A 28 and the value stored in the buffer B 29 are equal to each other, and outputs the condition coincidence signal "1". When the condition coincidence signal "1" is output, the condition coincidence frequency counter 31 counts up the count value to "4".

[Interrupt Control Register]

FIGS. 16A and 16B respectively show one example of the specification of the interrupt control register 33. FIG. 16A shows a configuration example of fields of the interrupt control register 33, and FIG. 16B shows the details of each field. As shown in FIG. 16A, the interrupt control register 33 has, for example, fields IE, CS0, CS1, IC0, and IC1. Incidentally, the field configuration of the interrupt control register 33 shown in FIG. 16A is illustrative. The field configuration of the interrupt control register 33 is not limited to the one shown in the drawing.

As shown in FIG. 16B, the field IE (Interrupt Enable) is a field for setting the presence or absence of an interrupt request. The value of "0" or "1" is set to the field IE. The value "0" indicates that the interrupt request is not made. The value "1" indicates that the interrupt request is made. When the value set to the field IE is "1", the interrupt request circuit 34 (refer to FIG. 1) requests an interrupt to the interrupt controller 19. When the value set to the field IE is "0", the interrupt request circuit 34 does not request an interrupt to the interrupt controller 19.

The field CS0 (Counter Select 0) is a field (counter selection field 0) for setting the use of the comparison frequency counter 32 for an interrupt condition. The value of "0" or "1" is set to the field CS0. The value "0" indicates that the comparison frequency counter 32 is not used for the interrupt condition. The value "1" indicates that the comparison frequency counter 32 is used for the interrupt condition. The field IC0 (Interrupt Count 0) is a field (count value setting field 0) for setting a count value of the comparison frequency counter 32 generating an interrupt. When the value of the field CS0 is "1", and the count value of the comparison frequency counter 32 is equal to the value of the field IC0; the interrupt request circuit 34 requests an interrupt to the interrupt controller 19.

The field CS1 (Counter Select 1) is a field (counter selection field 1) for setting the use of the condition coincidence frequency counter 31 for the interrupt condition. The value of "0" or "1" is set to the field CS1. The value "0" indicates that the condition coincidence frequency counter 31 is not used for the interrupt condition. The value "1" indicates that the condition coincidence frequency counter 31 is used for the interrupt condition. The field IC1 (Interrupt Count 1) is a field (count value setting field 1) for setting a count value of the condition coincidence frequency counter 31 generating an interrupt. When the value of the field CS1 is "1", and the count value of the condition coincidence frequency counter 31 is equal to the value of the field IC1, the interrupt request circuit 34 requests an interrupt to the interrupt controller 19.

[Operation Example]

Figure 17:
FIG. 17 is a diagram showing the values of the respective parts where a simple comparison is performed.

FIG. 17 shows the value of the condition coincidence frequency counter 31 where the simple comparison is performed. Consider here where the comparison condition is data A data B, the data size of data stored in each of the buffers A 28 and B 29 is 8 bits, and the data format is the complement of 2. Further, consider where the condition coincidence frequency counter 31 is used for the interrupt condition, and the count value of the condition coincidence frequency counter 31 generating the interrupt is "1". That is, consider where in the interrupt control register 33, the value of the field IE is "1", the value of the field CS0 is "0", the value of the field CS1 is "1", the value of the field IC0 is "0", and the value of the field IC1 is "1".

Since the data (value) stored in the buffer A 28 and the value stored in the buffer B 29 are equal in the first, second and third comparisons, the condition coincidence determining circuit 306 outputs a condition coincidence signal "0". In this case, the condition coincidence frequency counter 31 does not perform a countup, and its count value remains at an initial value "0". In the fourth comparison, the condition coincidence determining circuit 306 determines that the value stored in the buffer A 28 and the value stored in the buffer B 29 are not equal, and outputs a condition coincidence signal "1". When the condition coincidence signal "1" is output, the condition coincidence frequency counter 31 counts up the count value to "1".

When the count value of the condition coincidence frequency counter 31 becomes "1", the interrupt request circuit 34 determines that the interrupt condition has been established. When it is determined that the interrupt condition has been established, the interrupt request circuit 34 transmits an interrupt request to the interrupt controller 19. When it is determined that the interrupt condition has been established, the interrupt request circuit 34 may transmit a control signal to the comparison circuit 30 to stop a data comparison in the comparison circuit 30.

[Operation Procedure]

Figure 18:
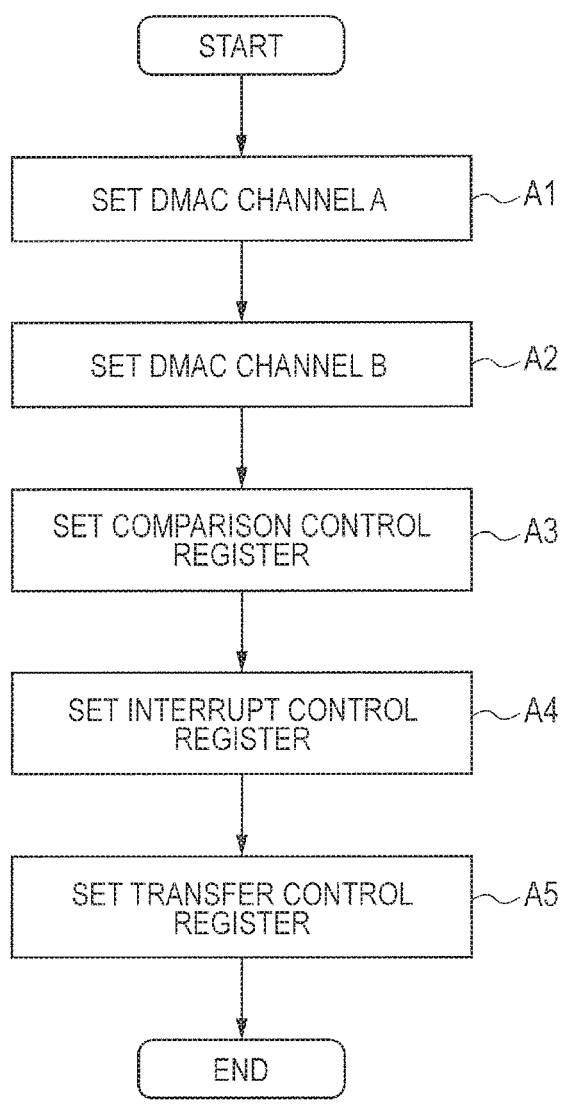
FIG. 18 is a flowchart showing a procedure of settings by a CPU.

FIG. 18 shows a procedure of setting operations executed by the CPU core A 12 or CPU core B 13. Although the following description will be made assuming that the CPU core A 12 sets the DMAC 20 and sets various registers in the memory comparison circuit 23, the CPU core B 13 may perform the setting operations.

The CPU core A 12 first performs the setting of the channel A of the DMAC 20 (Step A1) The CPU core A 12 accesses the register (refer to FIG. 2) of the DMAC 20, for example to set a starting address of a memory with data of a transfer source stored therein, an address updating method, a transfer frequency, and a data size, etc. for the channel A. In Step A1, the CPU core A 12 sets a start address of the data set A in FIG. 2, for example as a starting address for the DMA transfer and sets the transfer frequency as four times.

Then, the CPU core A 12 performs the setting of the channel B of the DMAC 20 (Step A2). The CPU core A 12 accesses the register of the DMAC 20, for example to set a starting address of a memory with data of a transfer source stored therein, an address updating method, a transfer frequency, and a data size, etc. for the channel B. The CPU core A 12 sets a start address of the data set B in FIG. 2, for example as a starting address for the DMA transfer and sets the transfer frequency as four times in Step A2. For example, when the CPU core A 12 writes data into the corresponding buffer without using the DMA transfer in one of the channels A and B, the setting of the DMAC 20 is unnecessary for the channel using no DMA transfer.

Subsequently, the CPU core A 12 performs the setting of the comparison control register 27 of the memory comparison circuit 23 (Step A3). In Step A3, the CPU core A 12 performs the setting of a comparison condition for a data comparison, the setting of a comparing method, and the setting of an allowable error in the case of an error allowance comparison, etc., which are executed in the comparison circuit 30 (refer also to FIG. 5B). Further, the CPU core A 12 performs the setting of the data size of data stored in each of the buffers A 28 and B 29, and the setting of its data format, etc.

The CPU core A 12 performs the setting of the interrupt control register 33 of the memory comparison circuit 23 (Step A4). In Step A4, the CPU core A 12 sets whether to request an interrupt, a counter used where the interrupt is requested, and a count value which becomes an interrupt condition, etc. (refer also to FIG. 16B).

The CPU core A 12 performs the setting of the transfer control register 25 of the memory comparison circuit 23 (Step A5). In Step A5, the CPU core A 12 performs the setting of a transfer mode for the channel A, the setting of a transfer mode for the channel B, and the setting of a transfer frequency according to the contents of the DMAC transfer set to the DMAC 20 in Steps A1 and A2 (refer also to FIG. 3B).

When the CPU core A 12 sets a value "1" to the field ST of the transfer control register 25 in Step A5, the DMA request circuit 26 of the memory comparison circuit 23 outputs a DMA request to the DMAC 20, so that the data transfer to the buffer A 28 and/or buffer B 29 is started. Each time the data is transferred to the buffer A 28 and the buffer B 29, for example, the memory comparison circuit 23 performs a data comparison on the basis of the comparison condition or the like set in Step A3. Further, the memory comparison circuit 23 requests an interrupt to the interrupt controller 19, based on the interrupt condition or the like set in Step A4.

[Usage Example]

A usage example of the memory comparison circuit 23 in the MCU 10 will be described. The memory comparison circuit 23 can he used for the purpose of verifying the operations of the CPU cores A 12 and B 13 which execute the same processing, for example. The CPU core A 12 performs certain processing, for example and outputs a data set A to the on-chip memory 15 or the like as a result of its processing (refer to FIG. 2). Further, the CPU core B 13 performs the same processing as one executed in the CPU core A 12 and outputs a data set B to the on-chip memory 15 or the like as a result of its processing. Since the CPU cores A 12 and B 13 perform the same processing, each data of the data set A and each data of the data set B respectively become the same value where the two CPU cores are normally operating.

For example, when the processing is finished, the CPU core A 12 accesses the DMAC 20 to perform the settings of the DMA transfer of the data set A to the buffer A 28 and the DMA transfer of the data set B to the buffer B 29. Further, the CPU core A 12 performs settings necessary for the respective registers of the memory comparison circuit 23. After the CPU core A 12 has confirmed the completion of the processing of the CPU core B 13, the CPU core A 12 writes a value "1" into the field ST (refer to FIG. 3B) of the transfer control register 25.

When the value "1" is written into the field ST of the transfer control register 25, the DMA request circuit 26 requests the DMA transfer to the DMAC 20. The DMAC 20 transfers each data of the data set A and each data of the data set B to the buffer A 28 and the buffer B 29 sequentially respectively. Since the respective data of the data sets A and B are respectively sequentially transferred to the buffer A 28 and the buffer B 29 in the memory comparison circuit 23, the comparison circuit 30 sequentially compares each data of the data set A and each data of the data set B.

Here, when each data of the data set A and each data of the data set B are equal to each other, it can be determined that the CPU core A 12 and the CPU core B 13 are normally operating. On the other hand, when each data of the data set A and each data of the data set B do not coincide with each other, there is a possibility that at least one CPU core is not operating normally. The comparison circuit 30 performs the data comparison on the comparison condition that the data of both buffers are not equal, and the condition coincidence frequency counter 31 counts the number of times of non-coincidence of both data.

After the CPU core A 12 has written the value "1" into the field ST of the transfer control register 25, the CPU core A 12 starts the execution of another processing, for example. In other words, when each data of the data set A and each data of the data set B are compared in the memory comparison circuit 23, the CPU core A 12 executes another processing. For example, when the count value of the condition coincidence frequency counter 31 becomes a prescribed value, e.g., "1", the interrupt request circuit 34 outputs an interrupt request to the interrupt controller 19. When the interrupt request is output, the interrupt controller 19 outputs an interrupt signal to the CPU core A 12. Hence, the CPU core A 12 executes reset processing, for example according to the interrupt signal. By doing so, the validity of the data set A and the data set B can be secured, and hence the MCU 10 is adaptable to applications for which high reliability is required.

[Summary]

In the present embodiment, the memory comparison circuit 23 compares the two data on the memory space, or the data on the memory space and the fixed value. Using such a memory comparison circuit 23 enables the data on the memory space to be compared without using the CPU core A 12 or the CPU core B 13 in the MCU 10. Further, in the present embodiment, the condition coincidence frequency counter 31 counts the number of times of coincidence with the comparison condition, and the comparison frequency counter 32 counts the number of times of executions of the data comparison. The interrupt request circuit 34 outputs the interrupt request to the interrupt controller 19, based on at least one of the count value of the condition coincidence frequency counter 31 and the count value of the comparison frequency counter 32. In the present embodiment, the interrupt condition can be set using the interrupt control register 33. In the MCU 10, the interrupt can be generated under a desired condition based on the count value.

In the present embodiment, the comparison circuit 30 performs the data comparison on the basis of the comparison conditions or the like set to the comparison condition register 27. By setting the desired comparison condition to the comparison control register 27 upon the data comparison, the comparison circuit 30 is capable of not only determining whether the data to be compared coincide, but also performing the data comparison on the desired comparison condition. Further, in the present embodiment, the data size and format of each data to be compared can be set to the comparison control register 27. The comparison circuit 30 is capable of comparing data of various data sizes and data formats.

Further, in the present embodiment, the frequency of the data transfer to each of the buffer A 28 and the buffer B 29, and the like are set to the transfer control register 25. According to the setting of the frequency of transfer to each buffer in the transfer control register 25, the comparison circuit 30 is capable of defining the data stored in one of the two buffers as the fixed value and comparing the data sequentially transferred to the other thereof from the memory space and the fixed value sequentially. Alternatively, the comparison circuit 30 is capable of sequentially comparing the data sequentially transferred to one buffer from the memory space and the data sequentially transferred to the other buffer.

[Embodiment 2]

Figure 19:
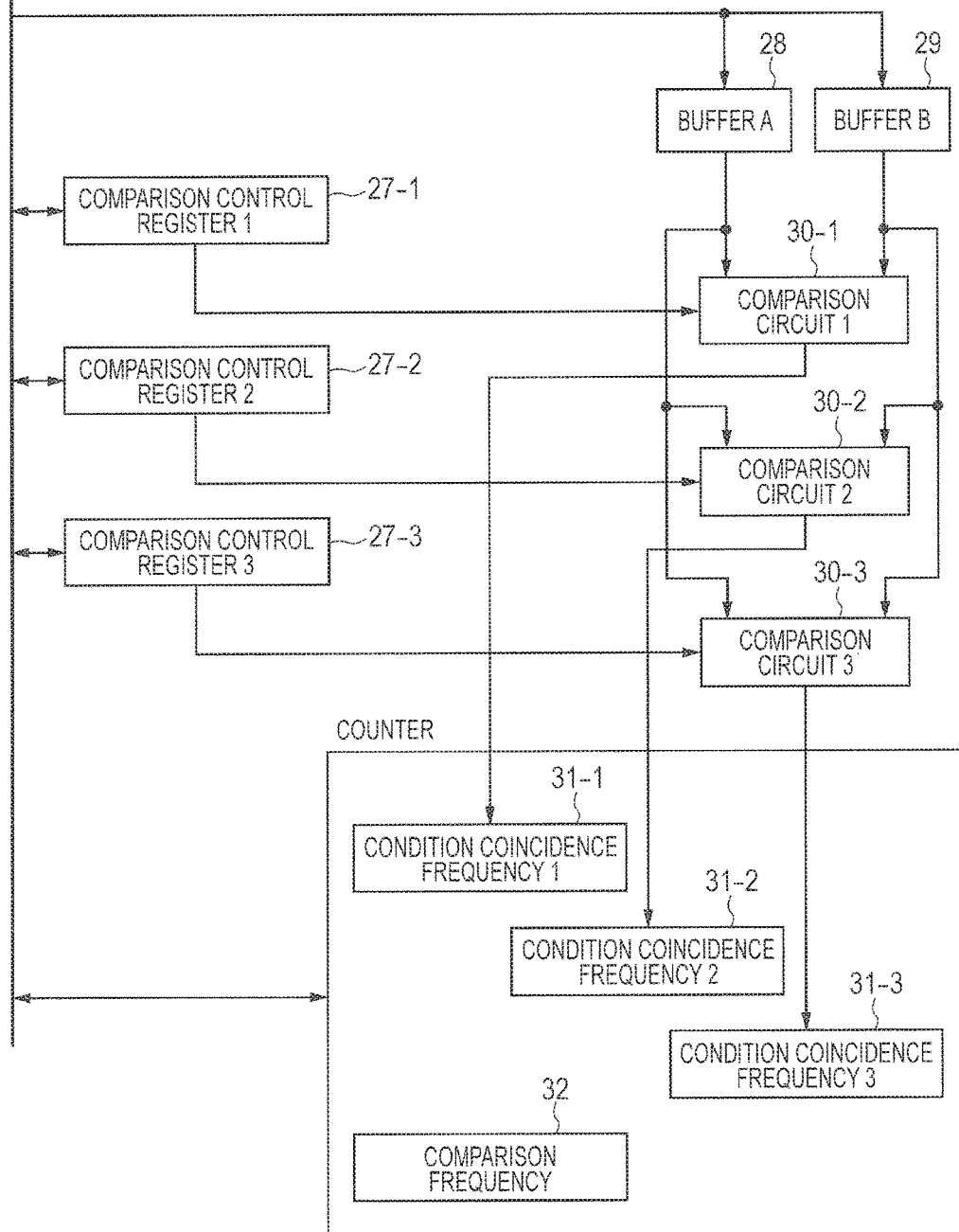
FIG. 19 is a block diagram showing a part of a memory comparison circuit used in an embodiment 2.

An embodiment 2 will next be described. In the present embodiment, a memory comparison circuit 23 is configured to be capable of data comparison on a plurality of comparison conditions FIG. 19 shows a part of the memory comparison circuit 23 used in the present embodiment. In the present embodiment, the memory comparison circuit 23 includes a plurality of comparison control registers 27, a comparison circuit 30, and a condition coincidence frequency counter 31. In the example of FIG. 19, the memory comparison circuit 23 has three comparison control registers 27-1 through 27-3, comparison circuits 30-1 through 30-3, and condition coincidence frequency counters 31-1 through 31-3. Other configurations may be similar to the embodiment 1.

The comparison control register (comparison control register 1) 27-1 is arranged corresponding to the comparison circuit (comparison circuit 1) 33-1 and stores therein setting information related to comparison contents (comparison condition) of the comparison circuit 30-1. The comparison circuit 30-1 compares data stored in a buffer A 28 and data stored in a buffer B 29 according to the contents set to each field (refer to FIGS. 5A and 5B) of the comparison control register 27-1. The condition coincidence frequency counter (condition coincidence frequency counter 1) 31-1 is arranged corresponding to the comparison circuit 30-1 and counts the frequency of coincidence of a comparison result with the comparison condition in the comparison circuit 30-1.

Likewise, the comparison control register (comparison control register 2) 27-2 and the condition coincidence frequency counter (condition coincidence frequency counter 2) 31-2 are arranged corresponding to the comparison circuit (comparison circuit 2) 30-2. The comparison control register (comparison control register 3) 27-3 and the condition coincidence frequency counter (condition coincidence frequency counter 3) 31-3 are arranged corresponding to the comparison circuit (comparison circuit 3) 30-3. The comparison circuits 30-2 and 30-3 respectively perform a data comparison, according to the contents of respective fields of the comparison control registers 27-2 and 27-3. The condition coincidence frequency counters 31-2 and 31-3 respectively count the number of times of coincidence of a comparison result with a comparison condition in the comparison circuits 30-2 and 30-3. In the present embodiment, it is possible to set comparison conditions and comparing methods different from each other, etc. to the comparison control registers 27-1 through 27-3.

[Interrupt Condition Register]

FIGS. 20A and 20B respectively show one example of the specification of an interrupt control register 33 used in the Present embodiment. FIG. 20A shows a configuration example of fields of the interrupt control register 33, and FIG. 20B shows the details of each field. The interrupt control register 33 used in the present embodiment has fields CS2, CS3, IC2, and IC3 in addition to the fields included in the interrupt control register 33 used in the embodiment 1 shown in FIG. 16A. Incidentally, the field configuration of the interrupt control register 33 shown in FIG. 20A is illustrative. The field configuration of the interrupt control register 33 is not limited to the one shown in the drawing. Since the roles of the fields IE, CS0, and IC0 are similar to the embodiment 1, their description will be omitted.

In the present embodiment, the field CS1 (Counter Select 1) is a field for setting the use of the condition coincidence frequency counter 31-1 for an interrupt condition. Further, the field CS2 (Counter Select 2) is a field for setting the use of the condition coincidence frequency counter 31-2 for an interrupt condition. The field CS3 (Counter Select 3) is a field for setting the use of the condition coincidence frequency counter 31-3 for an interrupt condition. The value of "0" or "1" is set to the fields CS1 through CS3 respectively. The value "0" indicates that the condition coincidence frequency counter is not used for the interrupt condition. The value "1" indicates that the condition coincidence frequency counter is used for the interrupt condition.

The field IC1 (Interrupt Count 1) is a field for setting a count value of the condition coincidence frequency counter 31-1 generating an interrupt. Further, the field IC2 (Interrupt Count 2) is a field for setting a count value of the condition coincidence frequency counter 31-2 generating an interrupt. The field IC3 (Interrupt Count 3) is a field for setting a count value of the condition coincidence frequency counter 31-3 generating an interrupt.

When the value of the field CS1 is "1", and the count value of the condition coincidence frequency counter 31-1 is equal to the value of the field IC1, an interrupt request circuit 34 requests an interrupt to an interrupt controller 19. When the value of the field CS2 is "1", and the count value of the condition coincidence frequency counter 31-2 is equal to the value of the field IC2, the interrupt request circuit 34 requests an interrupt to the interrupt controller 19. When the value of the field CS3 is "1", and the count value of the condition coincidence frequency counter 31-3 is equal to the value of the field IC3, the interrupt request circuit 34 requests an interrupt to the interrupt controller 19.

[Operation Example]

FIG. 21 shows the value of the condition coincidence frequency counter where a simple comparison and an error allowance comparison are simultaneously performed. Consider here where the comparison condition in the comparison circuit 30-1 is data A=data B, the comparing method is a simple comparison not allowing an error, the data size of data stored in each of the buffers A 28 and B 29 is 8 bits, and its data format is the complement of 2. That is, consider where in the comparison control register 27-1, the value of the field C is "0", the value of the field M is "0", the value of the field DS is "0", and the value of the field DF is "1". Further, consider where the comparison condition in the comparison circuit 30-2 is data A=data B, the comparing method is the error allowance comparison, its allowable error is "3", the data size of data stored in each of the buffers A 28 and B 29 is 8 bits, and its data format is the complement of 2. That is, consider where in the comparison control register 27-2, the value of the field C is "0", the value of the field M is "1", the value Of the field DS is "0" the value of the field DF is "1", and the value of the field AE is "3".

In the first comparison, the comparison circuits 30-1 and 30-2 respectively compare data "79" stored in the buffer A 28 and data "84" stored in the buffer B 29. Since in the first comparison, the data stored in the buffer A 28 and the value stored in the buffer B 29 are not equal, and the difference between the two is not an allowable error "3" or less, the condition coincidence frequency counters 31-1 and 31-2 do not perform a countup, and their count values respectively remain at an initial value "0".

In the second comparison, the comparison circuits 30-1 and 30-2 respectively compare data "32" stored in the buffer A 28 with data "33" stored in the buffer B 29. Since in the second comparison, the data stored in the buffer A 28 and the value stored in the buffer B 29 are not equal, the condition coincidence frequency counter 31-1 does not perform a countup, and its count value remains at an initial value "0". On the other hand, since the difference in data is the allowable error "3" or less, the condition coincidence frequency counter 31-2 performs a countup, and assumes its count value to be "1".

In the third comparison, the comparison circuits 30-1 and 30-2 respectively compare data "−128" stored in the buffer A 28 with data "−128" stored in the buffer B 29. Since in the third comparison, the data stored in the buffer A 28 and the value stored in the buffer B 29 are equal, the condition coincidence frequency counter 31-1 performs a countup and assumes its count value to be "1". Further, the condition coincidence frequency counter 31-2 also performs a countup and assumes its count value to be "2".

In the fourth comparison, the comparison circuits 30-1 and 30-2 respectively compare data "65" stored in the buffer A 28 with data "62" stored in the buffer B 29. Since in the fourth comparison, the data stored in the buffer A 28 and the value stored in the buffer B 29 are not equal, the condition coincidence frequency counter 31-1 does not perform a countup, and its count value remains at "1". On the other hand, since the difference in data is the allowable error "3" or less, the condition coincidence frequency counter 31-2 performs a countup, and assumes its count value to be "3".

In the fifth comparison, the comparison circuits 30-1 and 30-2 respectively compare data "−45" stored in the buffer A 28 with data "−40" stored in the buffer B 29. Since in the fifth comparison, the data stored in the buffer A 28 and the value stored in the buffer B 29 are not equal, and the difference between the two is not the allowable error "3" or less, the condition coincidence frequency counters 31-1 and 31-2 do not perform a countup, and their count values respectively remain at "1" and "3".

In the sixth comparison, the comparison circuits 30-1 and 30-2 respectively compare data "5" stored in the buffer A 28 and data "5" stored in the buffer B 29. Since in the sixth comparison, the data stored in the buffer A 28 and the value stored in the buffer B 29 are equal, the condition coincidence frequency counter 31-1 performs a countup and assumes its count value to be "2". Further, the condition coincidence frequency counter 31-2 also performs a countup and assumes its count value to be "4".

In the above operation example, consider, for example, where in the interrupt control register 33, the value of the field CS1 is set to "1", and the value of the field IC1 is set to "1". In that case, since the count value of the condition coincidence frequency counter 31-1 becomes "1" in the third comparison, the interrupt request circuit 34 requests an interrupt to the interrupt controller 19 after the third comparison. Further, since the count value of the condition coincidence frequency counter 31-2 becomes "1" in the second comparison where the value of the field CS2 is set to "1", and the value of the field IC2 is set to "1" in the interrupt control register 33, the interrupt request circuit 34 requests an interrupt to the interrupt controller 19 after the second comparison.

[Summary]

In the present embodiment, the memory comparison circuit 23 is capable of performing the comparison by the plural comparison conditions and comparing methods and generating the interrupt by using the plural comparison results. For example, when the simple comparison and the error allowance comparison are simultaneously performed, and the condition coincidence frequency reaches the number of times set to the interrupt control register 33 in either one of the two comparisons, the interrupt can be generated.

[Embodiment 3]

Figure 22:
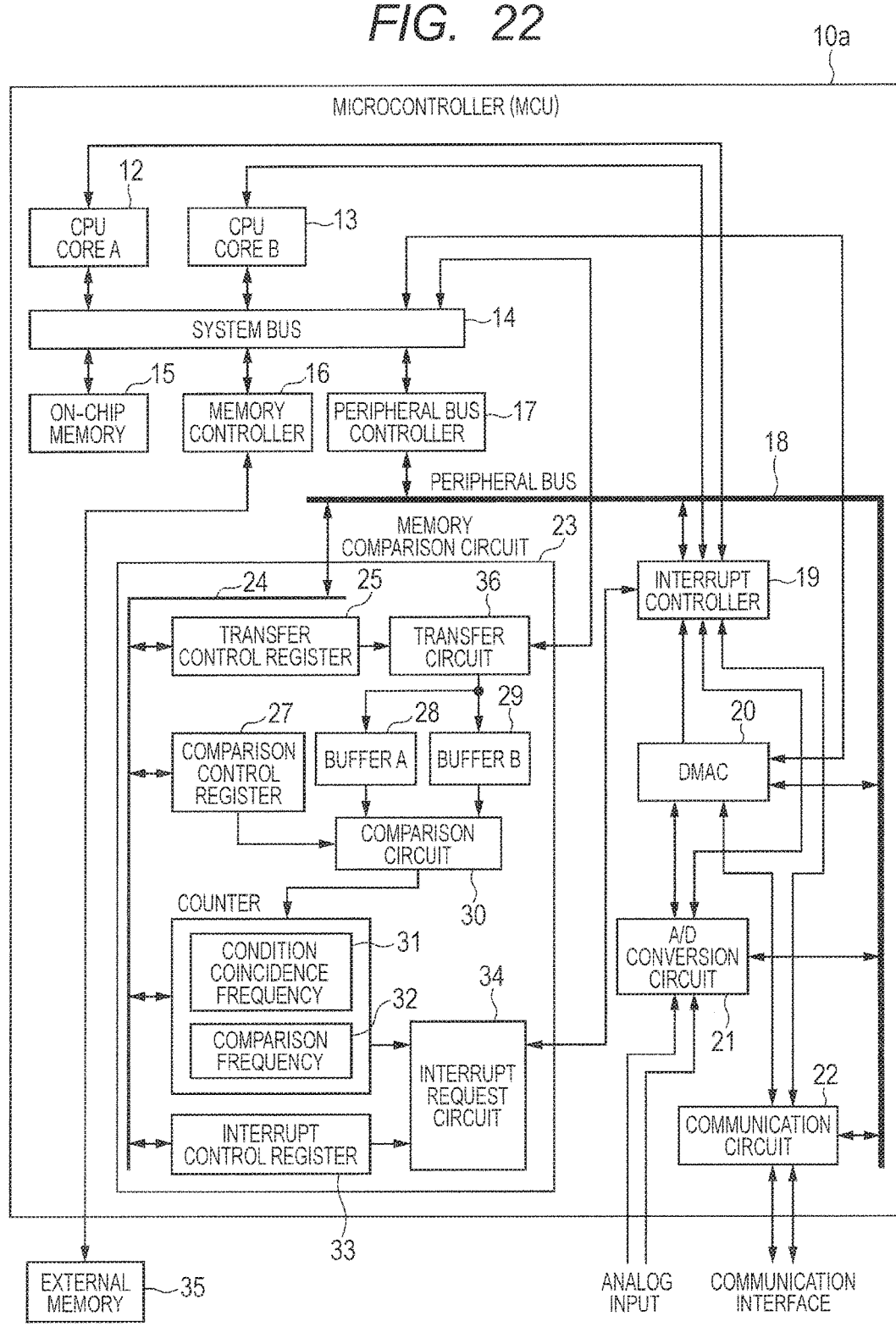
FIG. 22 is a block diagram showing a microcontroller unit having a memory comparison circuit according to an embodiment 3.

Subsequently, an embodiment 3 will be described. FIG. 22 shows an MCU having a memory comparison circuit according to the embodiment 3. The MCU 10a according to the present embodiment is different from the MCU 10 according to the embodiment 1 in that the DMA request circuit 26 of the memory comparison circuit 23 used in the embodiment 1 shown in FIG. 1 is replaced by a transfer circuit 36. The present embodiment may be similar in other respects to the embodiment 1 or 2.

In the embodiment 1, the DMAC 20 has transferred the data on the memory space to the buffer A 28 and/or buffer B 29. On the other hand, in the present embodiment, the transfer circuit 36 transfers data on a memory space to a buffer A 28 and/or buffer B 29. The transfer circuit 36 serves as a bus master of a system bus 14 and is accessible to an on-chip memory 15 and an external memory 35, for example. The transfer circuit 36 reads data from the on-chin memory 15 and the external memory 35, etc. and writes the read data into the buffer A 28 and/or buffer B 29.

In the present embodiment, a transfer control register 25 further has a field for setting a starting address of a data transfer source and an address updating method, etc. for a channel A and a channel B. The transfer circuit 36 performs the transfer of data to the buffer A 28 and/or buffer B 29 by referring to the transfer control register 25.

[Operation Procedure]

Figure 23:
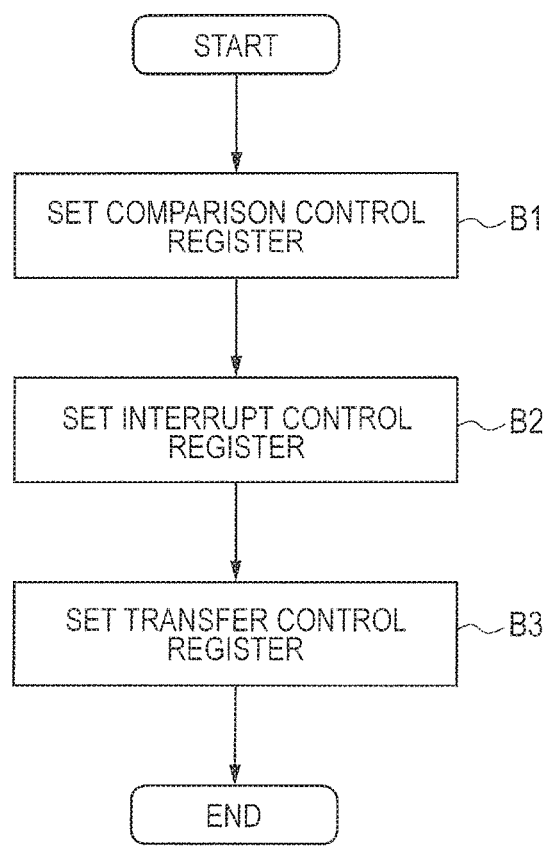
FIG. 23 is a flowchart showing a procedure of settings by a CPU in the embodiment 3.

FIG. 23 shows a procedure of setting operations executed by a CPU core A 12 or a CPU core B 13 in the present embodiment. Although the following description will be made assuming that the CPU core A 12 performs settings, the CPU core B 13 may perform the setting operations.

The CPU core A 12 performs the setting of a comparison control register 27 of the memory comparison circuit 23 (Step B1). In Step B1, the CPU core A 12 performs the setting of a comparison condition for a data comparison, the setting of a comparing method, and the setting of an allowable error in the case of an error allowance comparison, etc., which are executed in the comparison circuit 30 (refer also to FIG. 5B). Further, the CPU core A 12 performs the setting of the data size of data stored in each of the buffers A 28 and B 29, and the setting of its data format, etc.

The CPU core A 12 performs the setting of an interrupt control register 33 of the memory comparison circuit 23 (Step B2) In Step B2, the CPU core A 12 sets whether to request an interrupt, a counter used where the interrupt is requested, and a count value which becomes an interrupt condition, etc. (refer also to FIG. 16B).

The CPU core A 12 performs the setting of the transfer control register 25 of the memory comparison circuit 23 (Step B3). In Step B3, the CPU core A 12 performs the setting of a transfer mode for the channel A, the setting of a transfer mode for the channel B, and the setting of a transfer frequency (refer also to FIG. 3B). Further, in Step B3, the CPU core A 12 also performs settings of a starting address of a memory with data of a transfer source stored therein, an address updating method, etc. for the channels A and B respectively.

When the CPU core A 12 sets a value "1" to the field ST of the transfer control register 25 in Step B3, the transfer circuit 36 starts data transfer to the buffer A 28 and/or buffer B 29. Each time the data is transferred to the buffer A 28 and the buffer B 29, for example, the memory comparison circuit 23 performs a data comparison on the basis of the comparison condition or the like set in Step B1. Further, the memory comparison circuit 23 requests an interrupt to the interrupt controller 19, based on the interrupt condition or the like set in Step B2.

[Summary]

In the embodiment 1, a DMAC 20 performs data transfer to the buffer A 28 and/or buffer B 29. When the DMAC 20 performs the data transfer to the buffer, the DMAC 20 is required to write the data read from the on-chip memory 15 or the external memory 35 or the like into the buffer A 28 and/or buffer B 29 through the peripheral bus 18 and the interface 24 provided inside the memory comparison circuit. On the other hand, in the present embodiment, the transfer circuit 36 in the memory comparison circuit 23 performs the data transfer to the buffer A 28 and/or buffer B 29. In the present embodiment, the transfer circuit 36 is capable of performing writing of data into the buffer A 28 and/or buffer B 29 without via the peripheral bus 18 and the interface 24 inside the memory comparison circuit. It is therefore possible to shorten the time taken to transfer the data to the buffer as compared with the embodiment 1.

Although the invention made above by the present inventors has been described specifically on the basis of the preferred embodiments, the present invention is not limited to the embodiments already described. It is needless to say that various changes can be made thereto within the scope not departing from the gist thereof.

For example, some or all of the above embodiments can be also described as in the following appendices, but are not limited to the following.

[Appendix 1]

A semiconductor integrated circuit device includes:

a CPU;

an interrupt controller which outputs an interrupt signal to the CPU;

a first buffer and a second buffer which respectively store data to be compared therein;

a transfer circuit which transfers data on a memory space referable from the CPU to at least one of the first buffer and the second buffer;

a comparison circuit which compares first data stored in the first buffer with second data stored in the second buffer;

a comparison frequency counter which counts the number of times of comparison in the comparison circuit;

a condition coincidence frequency counter which counts the number of times at which a result of comparison by the comparison circuit coincides with a comparison condition; and an interrupt request circuit which outputs an interrupt request to the interrupt controller, based on at least one of the number of times of the comparison and the number of times of the coincidence.

[Appendix 2]

In the semiconductor integrated circuit device described in the appendix 1, the transfer circuit includes a DMA controller which controls DMA (Direct Memory Access) transfer, and a DMA request circuit which requests a start of the DMA transfer to the DMA controller.

[Appendix 3]

In the semiconductor integrated circuit device described in the appendix 1, the CPU performs a setting related to data transfer to at least one of the first buffer and the second buffer to the transfer circuit.

[Appendix 4]

The semiconductor integrated circuit device described in the appendix 1, further includes a comparison control register for controlling a comparison condition in the comparison circuit

[Appendix 5]

In the semiconductor integrated circuit device described in the appendix 4, the comparison condition includes at least one of the first data and the second data being equal to each other, the first data and the second data being unequal to each other, the first data being larger than or equal to the second data, the first data being larger than the second data, the first data being smaller than or equal to the second data, and the first data being smaller than the second data; and the comparison control register has a comparison condition setting field for setting the comparison condition.

[Appendix 6]

In the semiconductor integrated circuit device described in the appendix 4, the comparison control register has a comparison method setting field for setting whether to perform a comparison allowing an error, and an allowable error setting field for setting the value of an allowable error.

[Appendix 7]

In the semiconductor integrated circuit device described in the appendix 4, the first data and the second data respectively have a data size selected from a plurality of data sizes, and a data format selected from a plurality of data formats, and the comparison control register has a data size setting field for setting the data sizes of the first data and the second data, and a data format setting field for setting the data format.

[Appendix 8]

In the semiconductor integrated circuit device described in the appendix 7, the comparison circuit includes a first sign extension circuit which sign-extends the first data to data having a prescribed data size larger than the maximum data size of the data sizes and a prescribed data format, and a second sign extension circuit which sign-extends the second data to data having the prescribed data size and the prescribed data format, and compares the first data sign-extended by the first sign extension circuit with the second data sign-extended by the second sign extension circuit.

[Appendix 9]

The semiconductor integrated circuit device described in the appendix 1, further includes a transfer control register for storing setting information for the data transfer to the at least one of the first buffer and the second buffer.

[Appendix 10]

In the semiconductor integrated circuit device described in the appendix 9, the transfer control register has a first transfer mode setting field for setting a transfer mode of data to the first buffer, a second transfer mode setting field for setting a transfer mode of data to the second buffer, and a transfer frequency setting field for setting the number of times of data transfer.

[Appendix 11]

In the semiconductor integrated circuit device described in the appendix 10, a first value indicating the absence of the data transfer by the transfer circuit, a second value indicating that the number of times of the data transfer by the transfer circuit is once, or a third value indicating that the number of times of the data transfer by the transfer circuit is the number of times of transfer set to the transfer frequency setting field is set to the first transfer mode setting field and the second transfer mode setting field respectively.

[Appendix 12]

In the semiconductor integrated circuit device described in the appendix 11, the comparison circuit includes a first flag register to which a value indicating whether the data stored in the first buffer is valid is set;

a second flag register to which a value indicating whether the data stored in the second buffer is valid is set; and a clear signal generating circuit which generates a clear signal for clearing the values indicating that the data respectively set to the first flag register and the second flag register are valid, when the first value or the second value is set to the first transfer mode setting field, and the count value of the comparison frequency counter is a value smaller by one than the number of times of the transfer set to the transfer frequency setting field, the clear signal generating circuit outputs the clear signal to the first flag register when the first data and the second data are compared, and when the third value is set to the first transfer mode setting field, the clear signal generating circuit outputs the clear signal to the first flag register each time the first data and the second data are compared, and when the first value Or the second value is set to the second transfer mode setting field, and the count value of the comparison frequency counter is a value smaller by one than the number of times of the transfer set to the transfer frequency setting field, the clear signal generating circuit outputs the clear signal to the second flag register when the first data and the second data are compared, and when the third value is set to the second transfer mode setting field, the clear signal generating circuit outputs the clear signal to the second flag register each time the first data and the second data are compared.

[Appendix 13]

In the semiconductor integrated circuit device described in the appendix 12, when the value indicating that the data is valid is set to the first flag register and the second flag register, the comparison circuit compares the first data and the second data.

[Appendix 14]

In the semiconductor integrated circuit device described in the appendix 11, when the first value or the second value is set to the first transfer mode setting field, and the third value is set to the second transfer mode setting field, the comparison circuit compared the second data and the first data being a fixed value each time data is transferred to the second buffer, with the first data as the fixed value.

[Appendix 15]

In the semiconductor integrated circuit device described in the appendix 11, when the third value is set to both of the first transfer mode setting field and the second transfer mode setting field, the comparison circuit compares the first data with the second data each time data is transferred to the first buffer, and data is transferred to the second buffer.

[Appendix 16]

In the semiconductor integrated circuit device described in the appendix 9, the transfer control register has a transfer start setting field storing therein values for controlling the start and stop of the data transfer by the transfer circuit, and when the value indicative of the start of the data transfer is stored in the transfer start setting field, the transfer circuit starts the data transfer.

[Appendix 17]

The semiconductor integrated circuit device described in the appendix 1, further includes an interrupt control register for controlling an interrupt request condition for which the interrupt request circuit outputs the interrupt request.

[Appendix 18]

In the semiconductor integrated circuit device described in the appendix 17, the interrupt control register includes a first counter selection field for setting whether to use the comparison frequency counter for the interrupt condition, a second counter selection field for setting whether to use the condition coincidence frequency counter for the interrupt condition, a first count value setting field setting the count value of the comparison frequency counter, which becomes a trigger for the output of the interrupt request, and a second count value setting field setting the count value of the condition coincidence frequency counter, which becomes a trigger for the output of the interrupt request.

[Appendix 19]

In the semiconductor integrated circuit device described in the appendix 18, when the use of the comparison frequency counter for the interrupt condition is set to the first counter selection field, and the count value of the comparison frequency counter is equal to the value set to the first count value setting field, the interrupt request circuit outputs the interrupt request to the interrupt controller.

[Appendix 20]

In the semiconductor integrated circuit device described in the appendix 18, when the use of the condition coincidence frequency counter for the interrupt condition is set to the second counter selection field, and the count value of the condition coincidence frequency counter is equal to the value set to the second count value setting field, the interrupt request circuit outputs the interrupt request to the interrupt controller.

[Appendix 21]

In the semiconductor integrated circuit device described in the appendix 1, the comparison circuit and the condition coincidence frequency counter are provided in plural form, and the semiconductor integrated circuit device further includes a comparison control register for controlling a comparison condition in each of the comparison circuits.

[Appendix 22]

The semiconductor integrated circuit device described in the appendix 21, further includes an interrupt control register for controlling an interrupt request condition for which the interrupt request circuit outputs the interrupt request, in which the interrupt control register includes for each of the comparison circuits, a counter selection field for setting whether to use the condition coincidence frequency counter for the interrupt condition, and a count value setting field setting the count value of the condition coincidence frequency counter, which becomes a trigger for the output of the interrupt request.

[Appendix 23]

In the semiconductor integrated circuit device described in the appendix 1, the transfer circuit transfers data output from the CPU to a memory to at least one of the first buffer and the second buffer.

[Appendix 24]

In the semiconductor integrated circuit device described in the appendix 1, the CPU includes a first CPU and a second CPU, and the transfer circuit transfers first output data output from the first CPU to a memory to the first buffer, and transfers second output data output from the second CPU to the memory to the second buffer.

[Appendix 25]

In the semiconductor integrated circuit device described in the appendix 24, the first CPU and the second CPU execute the same processing, and the comparison circuit compares the first output data and the second output data with whether or not the first and second data being equal as a comparison condition.

[Appendix 26]

In the semiconductor integrated circuit device described in the appendix 25, the comparison condition indicates that the first data and the second data are unequal to each other, and when the count value of the condition coincidence frequency counter coincides with a prescribed value, the interrupt request circuit outputs the interrupt request.

[Appendix 27]

A data comparing method comprises the steps of:

transferring data from a memory referable from a CPU to at least one of a first buffer and a second buffer;

comparing first data stored in the first buffer and second data stored in the second buffer;

counting the number of times of comparison of the first data with the second data;

counting the number of times at which a compared result between the first data and the second data coincides with a comparison condition; and outputting an interrupt request to an interrupt controller, based on at least one of the number of times of the comparison and the number of times of the coincidence.

What is claimed is:

1. A semiconductor integrated circuit device comprising:
a CPU (Central Processing Unit);
an interrupt controller which outputs an interrupt signal to the CPU;
a first buffer and a second buffer which respectively store data to be compared therein;
a transfer circuit configured to control data transfer between the first buffer and a memory having a memory space referable from the CPU and data transfer between the second buffer and the memory;
a comparison circuit which compares first data stored in the first buffer with second data stored in the second buffer;
a comparison frequency counter which counts the number of times of comparison in the comparison circuit;
a condition coincidence frequency counter which counts the number of times at which a result of comparison by the comparison circuit coincides with a comparison condition; and
an interrupt request circuit which outputs an interrupt request to the interrupt controller, based on at least one of the number of times of the comparison and the number of times at which the result of comparison coincides with the comparison condition.

2. The semiconductor integrated circuit device according to claim 1, wherein the transfer circuit includes a DMA controller which controls DMA (Direct Memory Access) transfer, and a DMA request circuit which requests a start of the DMA transfer to the DMA controller.

3. The semiconductor integrated circuit device according to claim 1, further including a comparison control register for controlling a comparison condition in the comparison circuit.

4. The semiconductor integrated circuit device according to claim 1, further including a transfer control register for storing setting information for the data transfer to the at least one of the first buffer and the second buffer.

5. The semiconductor integrated circuit device according to claim 1, further including an interrupt control register for controlling an interrupt request condition for which the interrupt request circuit outputs the interrupt request.

6. The semiconductor integrated circuit device according to claim 1,
wherein the plural comparison circuits and the plural condition coincidence frequency counters are provided,
the semiconductor integrated circuit device further including a comparison control register for controlling a comparison condition in each of the comparison circuits.

7. The semiconductor integrated circuit device according to claim 1,
wherein the CPU includes a first CPU and a second CPU which execute the same processing,
wherein the transfer circuit transfers, to the first buffer, first output data output from the first CPU to a memory, and transfers, to the second buffer, second output data output from the second CPU to the memory, and
wherein the comparison circuit compares the first output data and the second output data with whether or not the first and second data being equal as a comparison condition.

8. The semiconductor integrated circuit device according to claim 1, wherein the first buffer and the second buffer receive data for storage externally from the semiconductor integrated circuit device, and
wherein the transfer circuit controls data transfer between the first buffer and the memory, and additionally controls data transfer between the second buffer and the memory.

9. The semiconductor integrated circuit device according to claim 3,
- wherein the comparison condition includes at least one of the first data and the second data being equal to each other, the first data and the second data being unequal to each other, the first data being larger than or equal to the second data, the first data being larger than the second data, the first data being smaller than or equal to the second data, and the first data being smaller than the second data; and
- wherein the comparison control register has a comparison condition setting field for setting the comparison condition.

10. The semiconductor integrated circuit device according to claim 3, wherein the comparison control register has a comparison method setting field for setting whether to perform a comparison allowing an error, and an allowable error setting field for setting the value of an allowable error.

11. The semiconductor integrated circuit device according to claim 3,
- wherein the first data and the second data respectively have a data size selected from a plurality of data sizes, and a data format selected from a plurality of data formats, and
- wherein the comparison control register has a data size setting field for setting the data sizes of the first data and the second data, and a data format setting field for setting the data format.

12. The semiconductor integrated circuit device according to claim 11, wherein the comparison circuit includes a first sign extension circuit which sign-extends the first data to data having a prescribed data size larger than the maximum data size of the data sizes and a prescribed data format, and a second sign extension circuit which sign-extends the second data to data having the prescribed data size and the prescribed data format, and compares the first data sign-extended by the first sign extension circuit with the second data sign-extended by the second sign extension circuit.

13. The semiconductor integrated circuit device according to claim 4, wherein the transfer control register has a first transfer mode setting field for setting a transfer mode of data to the first buffer, a second transfer mode setting field for setting a transfer mode of data to the second buffer, and a transfer frequency setting field for setting the number of times of data transfer.

14. The semiconductor integrated circuit device according to claim 13, wherein a first value indicating the absence of the data transfer by the transfer circuit, a second value indicating that the number of times of the data transfer by the transfer circuit is once, or a third value indicating that the number of times of the data transfer by the transfer circuit is the number of times of transfer set to the transfer frequency setting field is set to the first transfer mode setting field and the second transfer mode setting field respectively.

15. The semiconductor integrated circuit device according to claim 14, wherein the comparison circuit includes:
- a first flag register to which a value indicating whether the data stored in the first buffer is valid is set;
- a second flag register to which a value indicating whether the data stored in the second buffer is valid is set; and
- a clear signal generating circuit which generates a clear signal for clearing the values indicating that the data respectively set to the first flag register and the second flag register are valid,
- wherein when the first value or the second value is set to the first transfer mode setting field, and the count value of the comparison frequency counter is a value smaller by one than the number of times of the transfer set to the transfer frequency setting field, the clear signal generating circuit outputs the clear signal to the first flag register when the first data and the second data are compared, and when the third value is set to the first transfer mode setting field, the clear signal generating circuit outputs the clear signal to the first flag register each time the first data and the second data are compared, and
- wherein when the first value or the second value is set to the second transfer mode setting field, and the count value of the comparison frequency counter is a value smaller by one than the number of times of the transfer set to the transfer frequency setting field, the clear signal generating circuit outputs the clear signal to the second flag register when the first data and the second data are compared, and when the third value is set to the second transfer mode setting field, the clear signal generating circuit outputs the clear signal to the second flag register each time the first data and the second data are compared.

16. The semiconductor integrated circuit device according to claim 14, wherein when the first value or the second value is set to the first transfer mode setting field, and the third value is set to the second transfer mode setting field, the comparison circuit compares the second data with the first data being a fixed value each time data is transferred to the second buffer, with the first data as the fixed value.

17. The semiconductor integrated circuit device according to claim 14, wherein when the third value is set to both of the first transfer mode setting field and the second transfer mode setting field, the comparison circuit compares the first data with the second data each time data is transferred to the first buffer, and data is transferred to the second buffer.

18. The semiconductor integrated circuit device according to claim 4,
- wherein the transfer control register has a transfer start setting field storing therein values for controlling the start and stop of the data transfer by the transfer circuit, and
- wherein when the value indicative of the start of the data transfer is stored in the transfer start setting field, the transfer circuit starts the data transfer.

19. The semiconductor integrated circuit device according to claim 5, wherein the interrupt control register includes a first counter selection field for setting whether to use the comparison frequency counter for the interrupt condition, a second counter selection field for setting whether to use the condition coincidence frequency counter for the interrupt condition, a first count value setting field setting the count value of the comparison frequency counter, which becomes a trigger for the output of the interrupt request, and a second count value setting field setting the count value of the condition coincidence frequency counter, which becomes a trigger for the output of the interrupt request.

20. The semiconductor integrated circuit device according to claim 6, further including an interrupt control register for controlling an interrupt request condition for which the interrupt request circuit outputs the interrupt request,
- wherein the interrupt control register includes for each of the comparison circuits, a counter selection field for setting whether to use the condition coincidence frequency counter for the interrupt condition, and a count value setting field setting the count value of the condition coincidence frequency counter, which becomes a trigger for the output of the interrupt request.

* * * * *